United States Patent
Holcomb

(10) Patent No.: US 11,253,946 B2
(45) Date of Patent: Feb. 22, 2022

(54) INDUCTIVE ADDITIVE MANUFACTURING SYSTEM

(71) Applicant: Grid Logic Incorporated, Lapeer, MI (US)

(72) Inventor: Matthew J. Holcomb, Metamora, MI (US)

(73) Assignee: Grid Logic Incorporated, Lapeer, MI (US)

(*) Notice: Subject to any disclaimer, the term of this patent is extended or adjusted under 35 U.S.C. 154(b) by 505 days.

(21) Appl. No.: 14/300,655

(22) Filed: Jun. 10, 2014

(65) Prior Publication Data

US 2014/0363327 A1 Dec. 11, 2014

Related U.S. Application Data

(60) Provisional application No. 61/833,020, filed on Jun. 10, 2013, provisional application No. 61/868,625, (Continued)

(51) Int. Cl.
*B22F 3/10* (2006.01)
*B23K 13/01* (2006.01)
(Continued)

(52) U.S. Cl.
CPC .............. *B23K 13/01* (2013.01); *B22F 3/105* (2013.01); *B22F 3/1017* (2013.01); *B22F 7/02* (2013.01); *B22F 7/06* (2013.01); *B22F 10/00* (2021.01); *B22F 10/20* (2021.01); *B22F 12/41* (2021.01); *B23K 37/0235* (2013.01);
(Continued)

(58) Field of Classification Search
CPC ...... B22F 3/1055; B22F 3/1017; B22F 10/20; B22F 12/41; H05B 6/101; B23K 37/04
See application file for complete search history.

(56) References Cited

U.S. PATENT DOCUMENTS 2,622,238 A * 12/1952 Boltson ................. A61N 1/403
323/355
2,870,418 A 1/1959 Hewitt, Jr.
(Continued)

FOREIGN PATENT DOCUMENTS

DE 1020080027315 A1 12/2009

OTHER PUBLICATIONS

International Search Report and Written Opinion dated Dec. 31, 2014, International Patent Application No. PCT/US14/58389 with International Filing Date of Sep. 30, 2014, (8 pages).
(Continued)

*Primary Examiner* — Christopher S Kessler
(74) *Attorney, Agent, or Firm* — Stephen M. De Klerk

(57) ABSTRACT

A method for forming a component includes providing a first layer of a mixture of first and second powders. The method includes determining the frequency of an alternating magnetic field to induce eddy currents sufficient to bulk heat only one of the first and second powders. The alternating magnetic field is applied at the determined frequency to a portion of the first layer of the mixture using a flux concentrator. Exposure to the magnetic field changes the phase of at least a portion of the first powder to liquid. The liquid portion couples to at least some of the second powder and subsequently solidifies to provide a composite component.

12 Claims, 20 Drawing Sheets

Related U.S. Application Data filed on Aug. 22, 2013, provisional application No. 61/885,806, filed on Oct. 2, 2013, provisional application No. 61/896,896, filed on Oct. 29, 2013, provisional application No. 61/898,054, filed on Oct. 31, 2013, provisional application No. 61/938,881, filed on Feb. 12, 2014.

(51) Int. Cl.

| | | |
|---|---|---|
| *H05B 6/06* | (2006.01) | |
| *B23K 37/02* | (2006.01) | |
| *B23K 37/04* | (2006.01) | |
| *B22F 7/06* | (2006.01) | |
| *B22F 10/20* | (2021.01) | |
| *B22F 10/00* | (2021.01) | |
| *B22F 12/41* | (2021.01) | |
| *B22F 7/02* | (2006.01) | |
| *H05B 6/10* | (2006.01) | |
| *B22F 3/105* | (2006.01) | |
| *B22F 1/00* | (2022.01) | |
| *B23K 103/08* | (2006.01) | |
| *B23K 103/14* | (2006.01) | |
| *B23K 103/16* | (2006.01) | |
| *B23K 103/00* | (2006.01) | |
| *B22F 10/30* | (2021.01) | |
| *B22F 10/10* | (2021.01) | |

(52) U.S. Cl.
CPC .......... *B23K 37/04* (2013.01); *B23K 37/0426* (2013.01); *B23K 37/0461* (2013.01); *H05B 6/06* (2013.01); *H05B 6/101* (2013.01); *B22F 1/0003* (2013.01); *B22F 10/10* (2021.01); *B22F 10/30* (2021.01); *B22F 2003/1053* (2013.01); *B22F 2202/07* (2013.01); *B22F 2998/10* (2013.01); *B23K 2103/08* (2018.08); *B23K 2103/14* (2018.08); *B23K 2103/16* (2018.08); *B23K 2103/52* (2018.08); *Y02P 10/25* (2015.11)

(56) References Cited

U.S. PATENT DOCUMENTS

| | | | |
|---|---|---|---|
| 3,241,956 A | | 3/1966 | Kiyoshi |
| 4,231,796 A | | 11/1980 | Clark et al. |
| 4,255,494 A | | 3/1981 | Reen et al. |
| 4,521,659 A | | 6/1985 | Buckley et al. |
| 5,076,869 A | | 12/1991 | Bourell et al. |
| 5,147,587 A | | 9/1992 | Marcus et al. |
| 5,389,408 A | | 2/1995 | DeVolk |
| 5,555,481 A | | 9/1996 | Rock et al. |
| 5,640,667 A | | 6/1997 | Freitag et al. |
| 5,963,771 A | | 10/1999 | Chan et al. |
| 6,066,285 A | | 5/2000 | Kumar |
| 6,136,257 A | * | 10/2000 | Graf ........................ B22F 3/004 118/308 |
| 6,533,995 B1 | * | 3/2003 | Wullenweber ....... B01J 35/0033 419/9 |
| 8,382,834 B2 | | 2/2013 | Prescott |
| 9,457,403 B2 | * | 10/2016 | Holcomb .................. B22F 3/00 |
| 10,259,072 B2 | | 4/2019 | Holcomb |
| 2001/0050448 A1 | | 12/2001 | Kubo et al. |
| 2002/0105114 A1 | | 8/2002 | Kubo et al. |
| 2003/0024916 A1 | * | 2/2003 | Wright ................... B23K 9/044 219/123 |
| 2004/0099983 A1 | | 5/2004 | Dirscherl |
| 2004/0191406 A1 | | 9/2004 | Crum et al. |
| 2006/0124631 A1 | | 6/2006 | Alfredeen |
| 2007/0022823 A1 | | 2/2007 | Knill et al. |
| 2007/0235445 A1 | | 10/2007 | Wilgen et al. |
| 2007/0241482 A1 | * | 10/2007 | Giller .................. B29C 67/0066 264/494 |
| 2010/0015002 A1 | | 1/2010 | Barrera et al. |
| 2011/0297658 A1 | * | 12/2011 | Peters ...................... B23K 9/02 219/162 |
| 2012/0329659 A1 | | 12/2012 | Holcomb |
| 2013/0189385 A1 | | 7/2013 | Zoppas et al. |
| 2013/0329659 A1 | | 12/2013 | Holcomb |
| 2014/0163717 A1 | | 6/2014 | Das et al. |
| 2014/0314964 A1 | | 10/2014 | Ackelid |
| 2014/0361464 A1 | | 12/2014 | Holcomb |
| 2015/0296571 A1 | | 10/2015 | Holcomb |
| 2015/0367448 A1 | | 12/2015 | Buller et al. |

OTHER PUBLICATIONS

International Search Report and Written Opinion dated May 25, 2017, International PCT Patent Application No. PCT/US201/016574 with International Filing Date of Feb. 3, 2017, (17 pages).

Invitation to Pay Additional Fees p PCT Article 17(3)(a) and Rules 40.1 and 40.2(e) dated Apr. 2, 2017, International PCT Patent Application No. PCT/US17/16574 with International Filing Date of Feb. 3, 2017, (3 pages).

"Materials safety data sheet for carbon nanotubes", supplied by Cheap Tubes Inc. Revision Date: Apr. 13, 2015, (9 pages).

"Physical properties of titanium and its alloys", Total Materia. http://www.totalmateria.com/Articles122.htm. Published May 2005. Accessed Dec. 29, 2016., (2 pages).

Final Office Action dated Dec. 13, 2018, U.S. Appl. No. 14/502,665 , (7 pages).

Non Final Office Action dated Feb. 22, 2018, U.S. Appl. No. 14/459,096 , (10 pages).

Non Final Office Action dated Jun. 12, 2017, U.S. Appl. No. 14/300,621 , (9 pages).

Extended European Search Report dated Jul. 19, 2019, European Patent Application No. 17748302.1, (10 pages).

First Office Action dated Mar. 3, 2020 with English translation, Chinese Patent Application No. 201780008924.8, (47 pages).

Communication Pursuant to Article 94(3) EPC dated Jul. 23, 2020, European Patent Application No. 17748302.1, (7 pages).

Non Final Office Action dated Oct. 26, 2020, U.S. Appl. No. 16/202,453, (23 pages).

Agarwal, D. , "Microwave sintering of ceramics, composites and metal powders. Sintering of advanced materials", Woodhead Publishing. 2010. (Year: 2010), pp. 222-248.

Popovic, Zoya et al., ""The Skin Effect", Introductory Electromagnetics", Chapter 20, Prentice-Hall. (Year: 1999), pp. 382-392.

\* cited by examiner

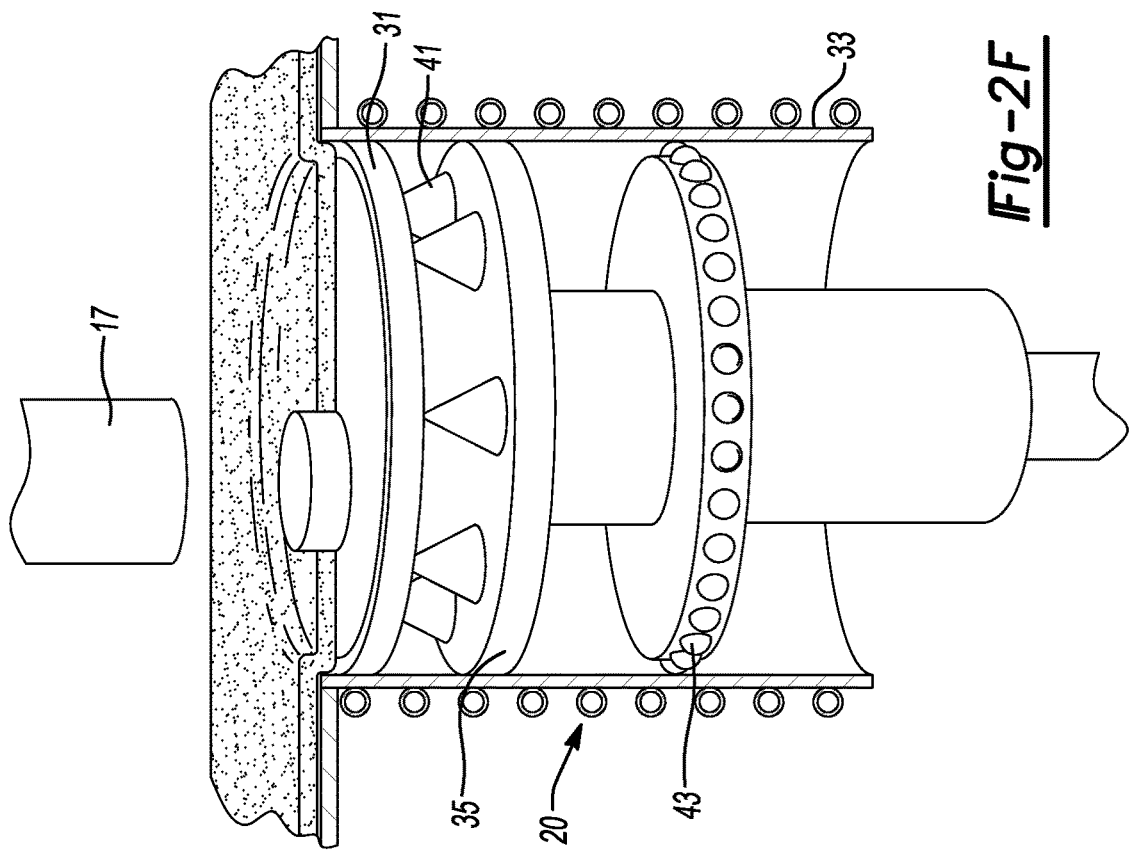
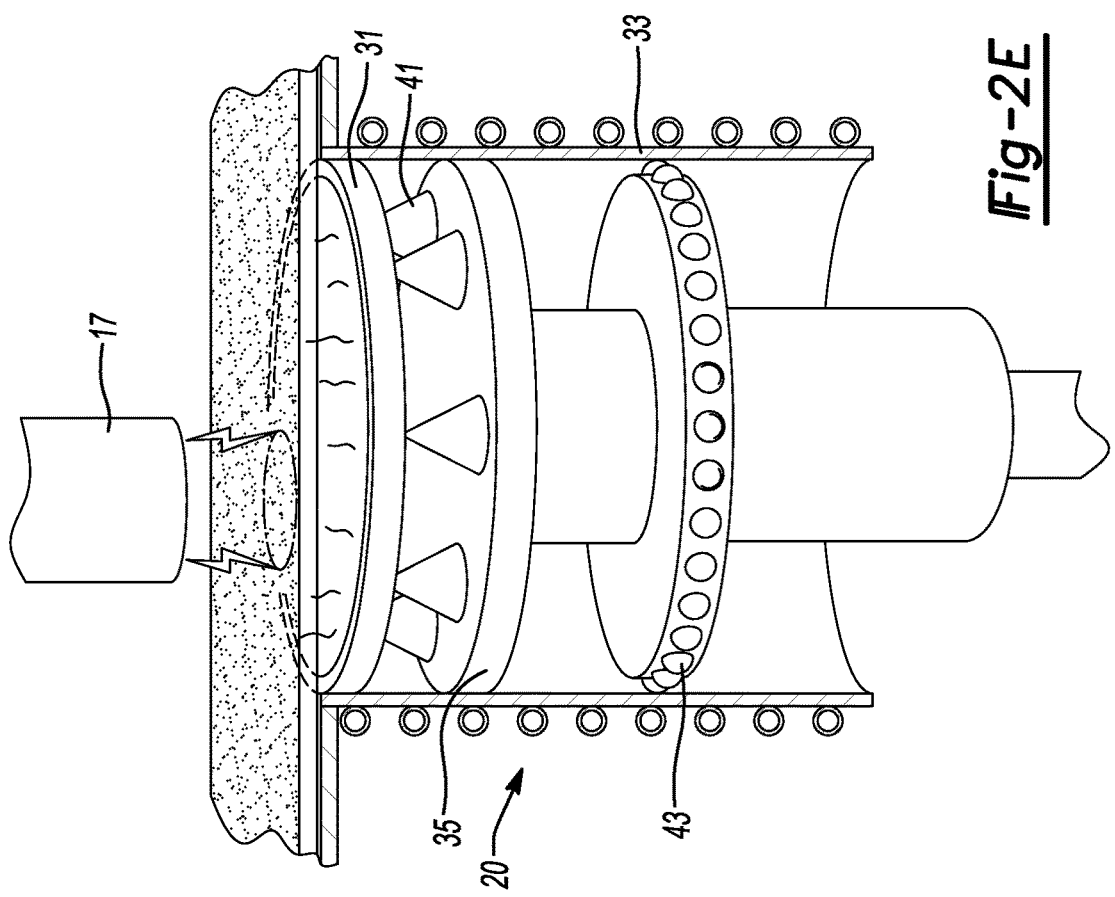

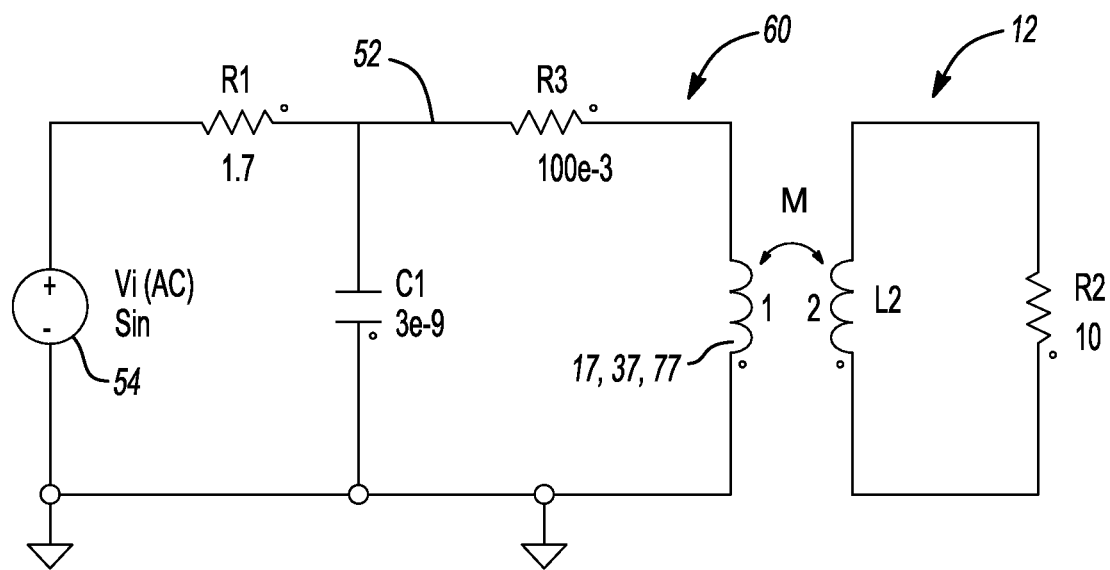
*Fig-11*
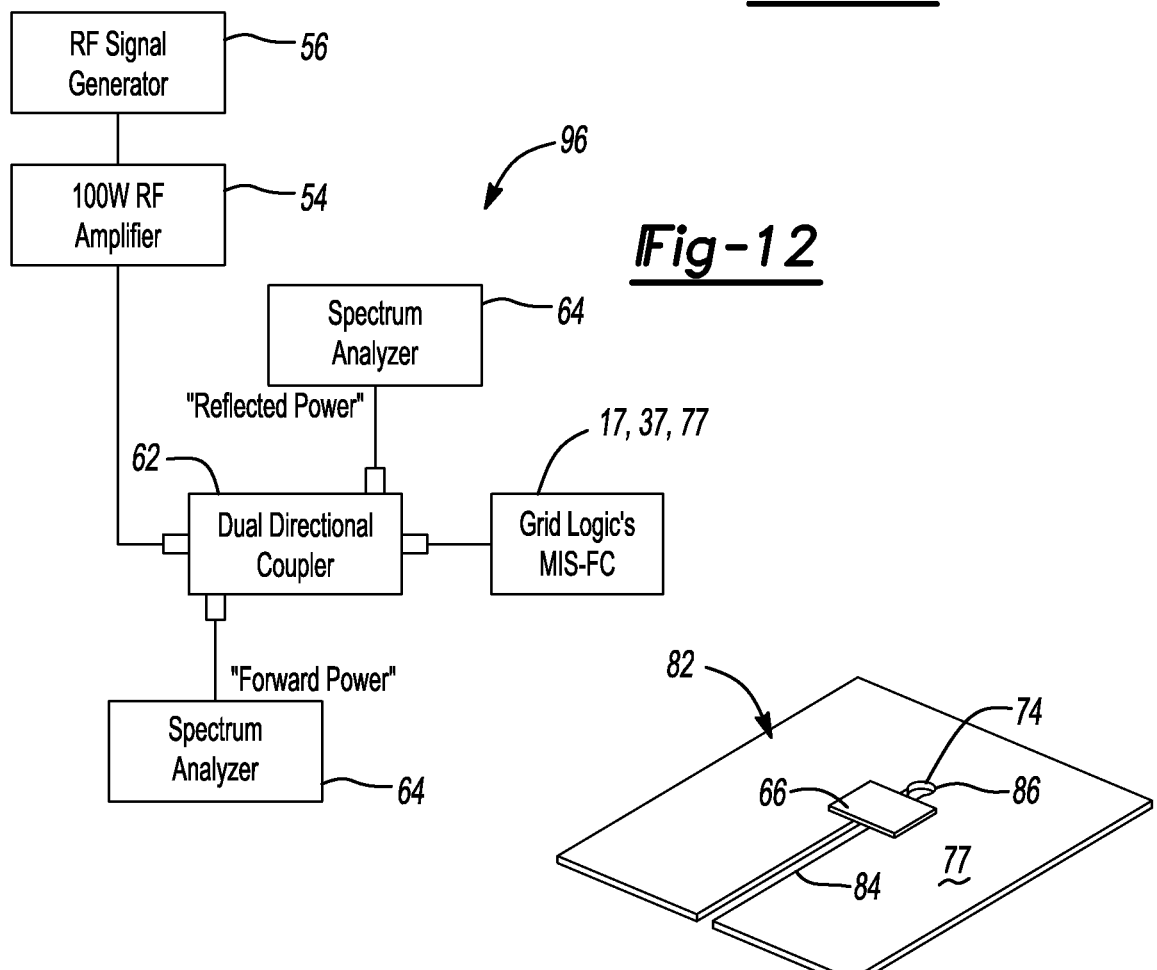
*Fig-12*
*Fig-13A*

INDUCTIVE ADDITIVE MANUFACTURING SYSTEM

CROSS-REFERENCE TO RELATED APPLICATIONS

This application claims the benefit of U.S. Provisional Application No. 61/833,020 filed on Jun. 10, 2013, U.S. Provisional Application No. 61/868,625 filed on Aug. 22, 2013, U.S. Provisional Application No. 61/885,806 filed on Oct. 2, 2013, U.S. Provisional Application No. 61/896,896 filed on Oct. 29, 2013, U.S. Provisional Application No. 61/898,054 filed on Oct. 31, 2013, and U.S. Provisional Application No. 61/938,881 filed on Feb. 12, 2014. The entire disclosures of each of the above applications are incorporated herein by reference.

FIELD

The present disclosure relates to a system for additive manufacturing and, more particularly, to a system and method of selectively sintering a material using micro-induction sintering.

BACKGROUND

This section provides background information related to the present disclosure which is not necessarily prior art.

Current processes for producing high purity bi-component materials, such as refractory metal parts, include powder and ingot metallurgy. The ingot metallurgy process begins with selecting and blending suitable powders, pressing into bars, and sintering. An electron beam or plasma or arc furnace is used to melt the bar in an inert atmosphere and cool it into an ingot. The melting can be done in multiple steps. Electron beam melting and re-melting removes impurities to produce an essentially pure ingot. The ingot is thermo-mechanically processed and further cold or hot worked as needed (or cold worked with intermediate annealing) to produce a desired shape such as plate, sheet, rod or fabricated. Components may also be machined directly from ingots.

The sintering process consumes a significant amount of furnace time, but it is required to provide sufficient mechanical strength in the bars and is a preliminary deoxidation step for the refractory metal powder, such as tantalum. The bars are usually electron beam-melted under a hard vacuum to remove impurities. The electron beam melting process can also consume a significant amount of furnace time and power.

Laser additive manufacturing is a direct deposition process that uses a high power laser and powder feeding system to produce complex three-dimensional components from metal powders. The high power laser and multi-axis positioning system work directly from a CAD file to build up the component using a suitable metal powder. This process is similar to conventional rapid prototyping techniques such as stereolithography, selective laser sintering (SLS), and laser welding. Laser welding was developed to join two components or to fabricate an article integral to a component. Such a laser process has been used to manufacture near-net shape titanium components for the aerospace industry.

To date, an additive manufacturing process does not exist for higher temperature bi-component refractory and tooling materials, or bi-materials, where one material is sensitive to the high energy applied by the laser. The application of a directed high energy beam to a powder mixture can cause damage to one or more of its constituent components. In this regard, this energy can cause undesired phase and structural changes within one or both of these component materials. As an example, superconductors encapsulated into a metal matrix are highly sensitive to the application of a laser-induced energy which may destroy their superconducting capabilities. Additional problems can occur when the application of a laser to a powder mixture leads to undesired chemical reactions between the materials. As such, there is a need for an additive manufacturing system that overcomes some of the deficiencies listed above and allows for a more creative combination of materials.

SUMMARY

This section provides a general summary of the disclosure, and is not a comprehensive disclosure of its full scope or all of its features.

According to the present teachings, a system for forming a component is disclosed. The system has a table, a platen movable relative to the table, an actuator movable with respect to the table and the platen, a powder dispenser configured to provide a layer of a material over the table and the movable platen. A bulk induction heater is configured to provide an alternating magnetic field to induce eddy currents sufficient to bulk heat the platen. A flux concentrator is coupled to the actuator and configured to apply a high frequency alternating magnetic field to a portion of the layer. Exposure to the high frequency alternating magnetic field changes the phase of at least a portion of the layer to liquid.

According to another teaching, a method of induction heating a powder to form a component is disclosed. A first layer of powder is placed over a platen. A first frequency of an alternating magnetic field to induce an eddy current sufficient to melt only a first portion of the powder is applied to the powder. A second alternating magnetic field is applied to the platen at a power level sufficient to heat the platen to heat the formed component.

According to the present teachings, a system for forming a component is disclosed. The system has a mixer configured to mix a first powder material with a second powder material to form a powder mixture. An X-Y-Z gantry having a micro inductive sintering magnetic concentrator is provided above a build surface. A heater configured to heat a component surface is provided. The system includes a material dispenser configured to place layers of a first material on the component being built. The flux concentrator coupled to the X-Y-Z gantry is configured to apply a concentrated magnetic field of at least one frequency between about 1 MHz and 2.0 GHz to melt a portion of only the first material.

According to an alternate technology, the system above further includes a mechanism for applying a second layer of a second mixture of material in contact with the first layer. The system then applies a second magnetic field to the second layer to melt a second portion of the second layer, where the second portion is fused to the first layer when the second magnetic field is removed. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2F represent a moveable platen shown in FIG. 1B;

FIG. 11 represents a resonant tank circuit for a micro-inductive sintering concentrator interacting with sintering powder;

FIG. 12 represents a block diagram of a voltage standing wave ratio test system configured to evaluate the status of a sintering process;

FIG. 13A-13D depicts an alternate flux concentrator according to the present teachings;

Corresponding reference numerals indicate corresponding parts throughout the several views of the drawings.

DETAILED DESCRIPTION

Figure 1A:
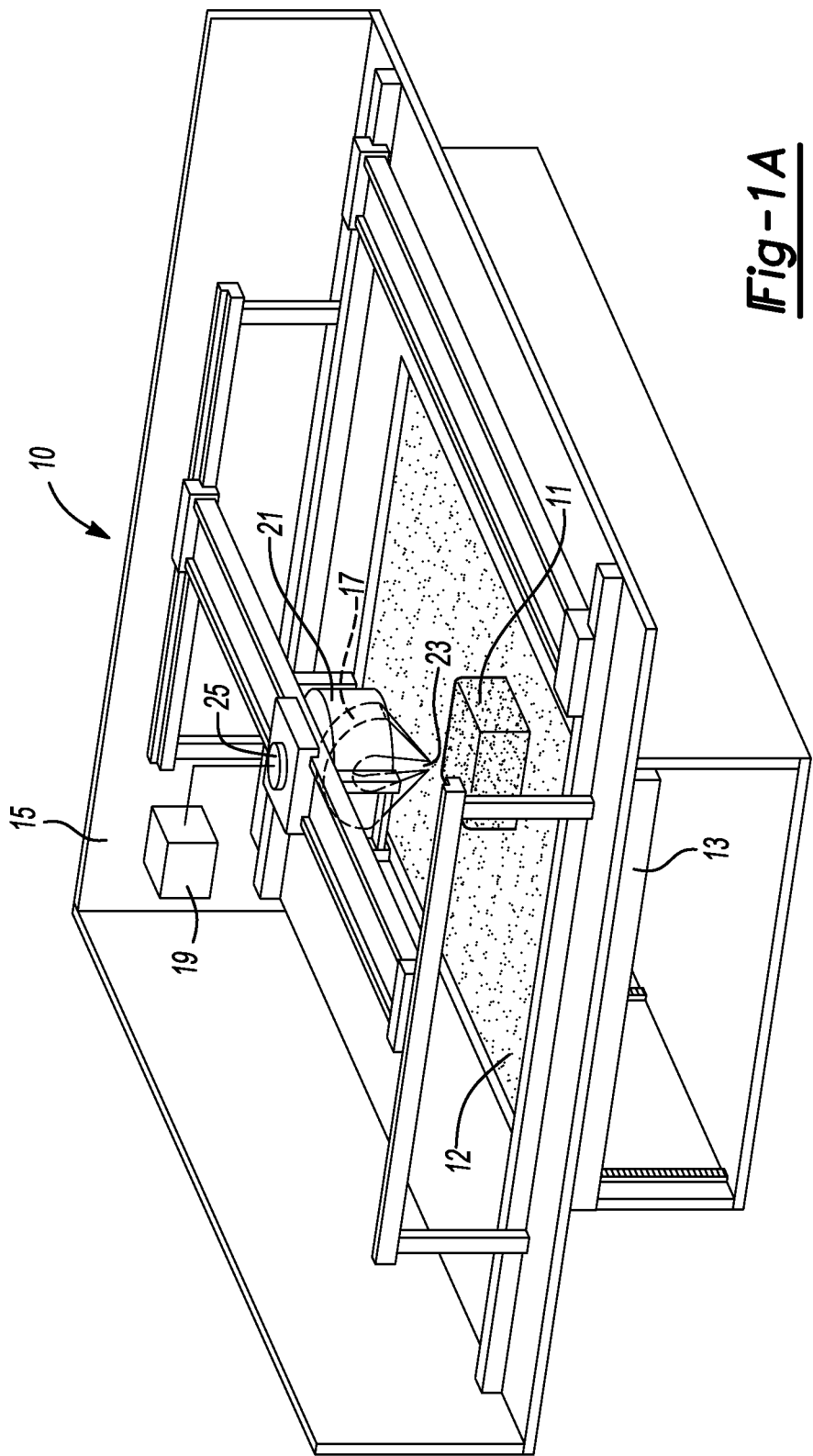
FIG. 1A-1D represent a schematic representation of the additive manufacturing system according to the present teachings.
Figure 1B:
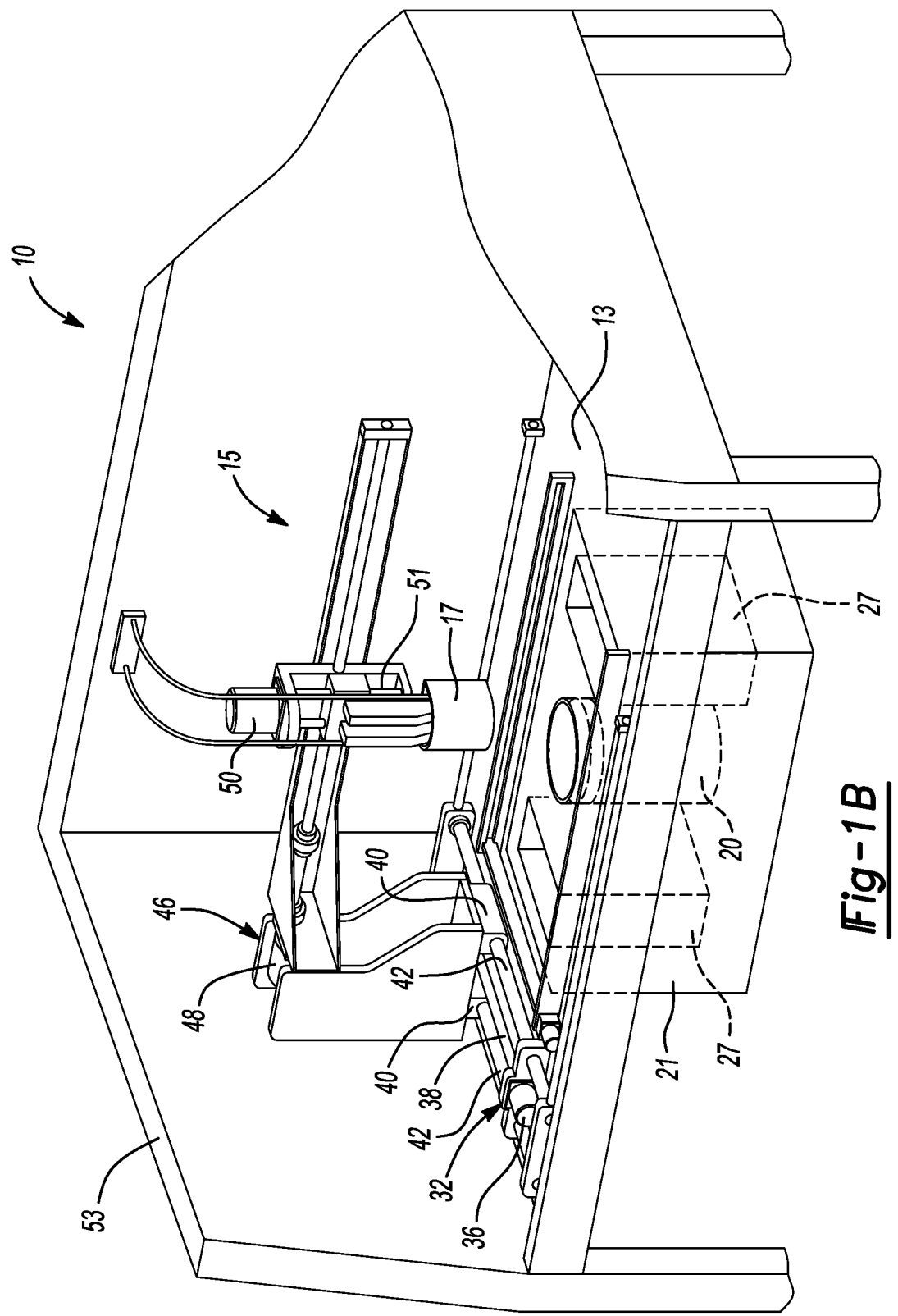
Figure 1C:
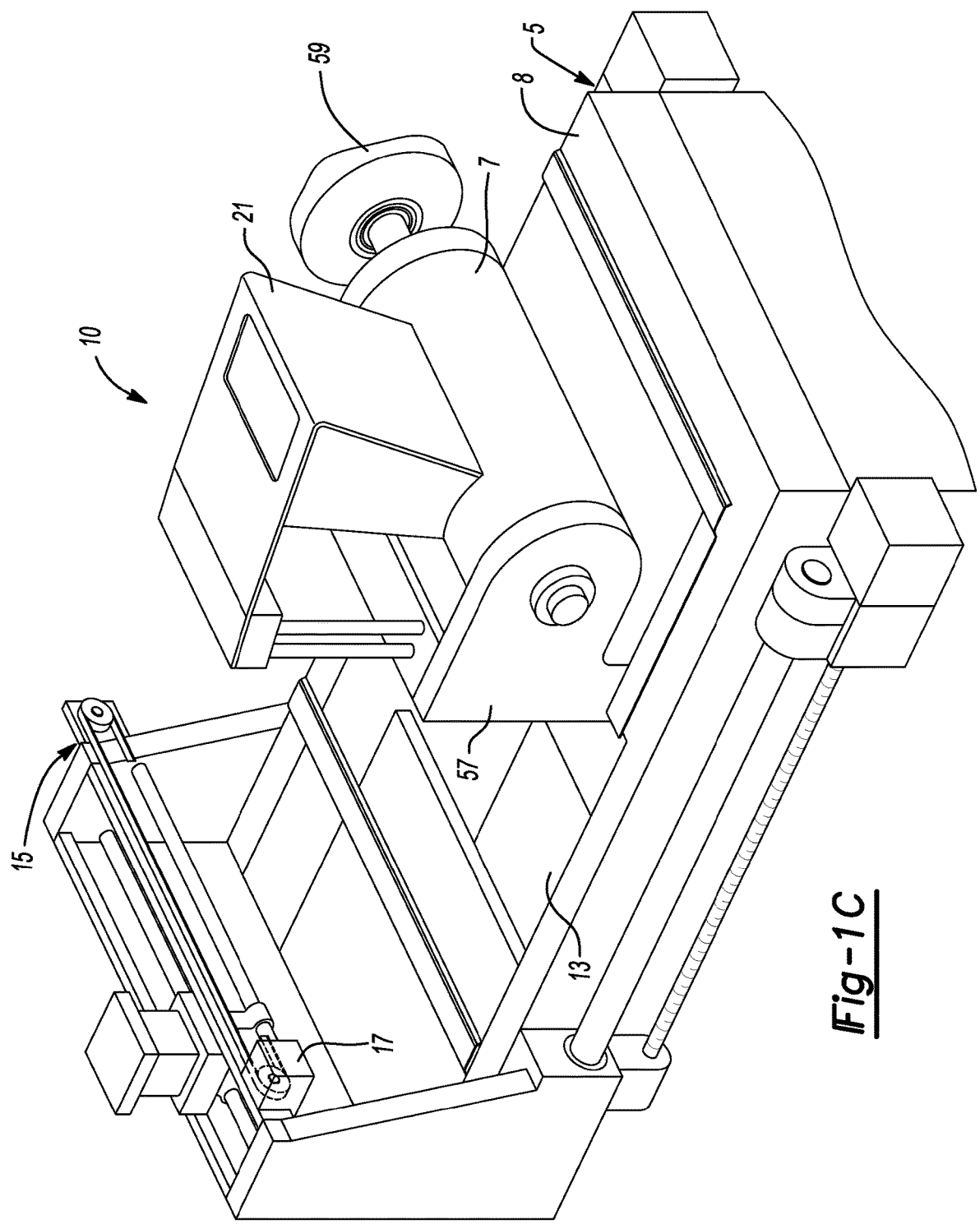
Figure 1D:
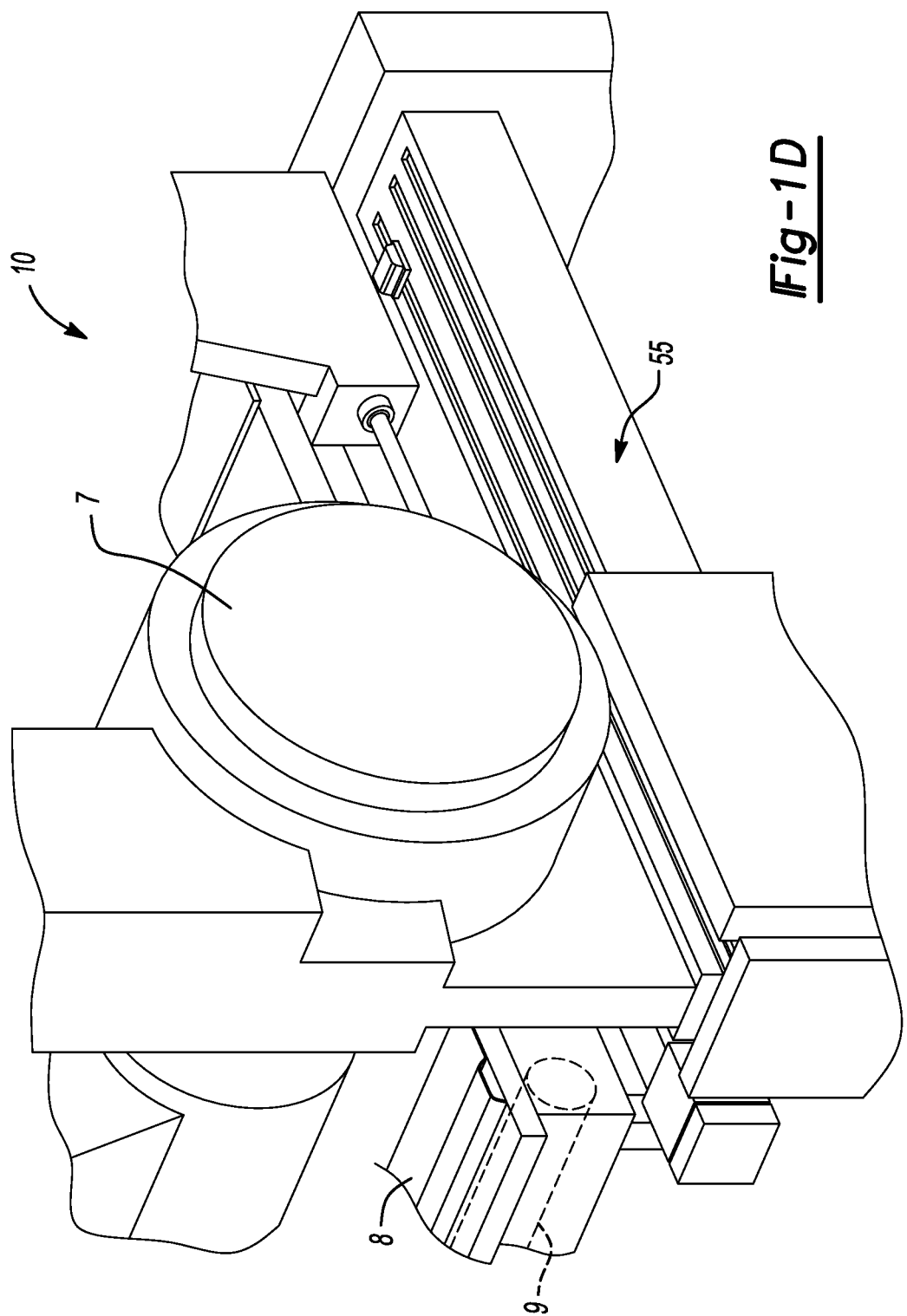

Example embodiments will now be described more fully with reference to the accompanying drawings.

FIGS. 1A-1D depict a system 10 for producing a component 11 using an additive micro-inductive sintering (MIS) method in which layers of a mixture of powder 12 is consolidated. A powder holding tray or bed 13 retains the mixture of powder 12. Disposed above the bed 13 is an X-Y-Z gantry 15 which supports a magnetic flux concentrator 17. A power supply and wave form generator 19 provides energy to magnetic flux concentrator 17 to apply a distinct, high frequency alternating magnetic field to selectively heat and melt individual particles of the mixture of powder 12.

System 10 further includes a dispensing mechanism 21 having a pouring spout and leveling mechanism that recursively places layers of the mixture of powder 12 over previously consolidated portions of the mixture of powder 12. Also shown is a sensor 25 that detects information such as a power transfer to the mixture of powder 12 and the degree of consolidation.

The powder bed 13 is housed in an inert atmosphere box (not shown). The system 10 is capable of maintaining both the powder and formed component at temperatures in excess of 1100° C. This is achieved by directly heating the as-grown part in the powder bed using an integrated high-power low-frequency induction heater 20. As seen in the FIG. 1B, the powder bed 13 has a conventional screed-based powder bed with powder "feed" and "catch" reservoirs 27 located on each side of the active area of the powder bed. Optionally, a vibrating tamper can be used to compress the powder. An integrated refrigeration system (not shown) cools both the induction heater 20 and the exterior panels of the powder bed housing during operation.

The system 10 includes a table 29 having a planar surface 30. A platen 31 is movable in a direction perpendicular to the planar surface 30. Powder dispensing mechanism 21 is configured to provide a first planar layer of a mixture of first and second powders over the planar table surface 30 and the movable platen 31. As described below with reference to FIGS. 2A-2F, bulk induction heater 20 is configured to provide an alternating magnetic field to induce eddy currents sufficient to bulk heat the platen 31. The bulk induction heater 20 is disposed about the platen 31.

The X-Y-Z gantry 15 may also be referred to as a MIS CNC stage. MIS CNC stage 15, shown in FIGS. 1A-1D, is a "post and boom" style X-Y stage with limited travel in the Z-axis. A Y-axis "post" assembly 32 is driven by a single 24V NEMA 23 stepper motor 36, which is connected to a precision Acme lead screw 38. The entire "post" assembly is mounted on parallel pillow blocks 40 equipped with linear bearings that slide on two precision ground shafts 42. An X-axis "boom" assembly 46 consists of an Acme screw drive system that is driven by a single NEMA 23 stepper motor 48. Limited travel in the Z-axis is achieved with a third NEMA 23 stepper motor 50 and a short precision Acme lead screw drive 51.

In an alternate configuration, the gantry Y-axis may be driven by two 12V NEMA 1.7 stepper motors, which are connected to two precision lead screws and operate in unison. The X-axis may be driven by a cogged belt system that is driven by a NEMA 1.7 single stepper motor. Limited travel in the Z-axis is achieved with a NEMA 1.7 stepper motor and a short precision lead screw drive. The CNC stage has an operating area of 170 mm×250 mm with approximately 50 mm of vertical travel.

The entire X-Y-Z gantry 15 is located within the footprint of a two-glove inert atmosphere box 53 that has been modified to accommodate a manual 2D powder screed system. In the present configuration, the CNC stage 15 has an operating area of approximately 330 mm×330 mm (~13"×13") with approximately 60 mm of vertical travel. It is important to note that the working area of the system is limited only by the available footprint of the inert atmosphere environment and not necessarily by a fundamental limitation of the CNC stage.

Dispensing system 21 is designed to reproducibly deposit powders (for example Geldart Class C powders) in uniform layers on planar surface 30 and platen 31. Dispensing system 21 may be mounted separately from X-Y-Z gantry 15. The alternate dispensing system 21 consists of three components all mounted on a precision linear translation stage 5: a powder hopper 7, a vibrating screed 8, and a compression roller 9. The powder hopper 7 includes a cylindrical chamber equipped with four rotating blades that travel along the inner perimeter of the cylinder. The powder hopper 7 may be filled with tungsten carbide (WC) spheres that are slowly mixed by the motion of the internal blades. When filled with powder, the WC spheres serve to slowly "fluidize" the cohesive Geldart Class C powder. A narrow slot along the bottom portion of the powder hopper allows for to be deposited in a relatively uniform fashion as the entire assembly moves over the powder bed 13. Immediately after the is deposited on the powder bed 13, vibrating screed 8 passes over the loosely packed, freshly deposited material. Screed 8 serves to both level the Geldart Class C powder, and to redistribute the material over the surface of the powder bed 13 to achieve a more uniform layer. The high frequency vibration at the screed 8 aids in the local fluidization of the powder, but does not disturb the previously deposited layers. Immediately after the screed 8 passes over the loose Geldart Class C powder, the Geldart Class C powders layer is compressed using polished cylindrical roller 9 that travels along precision guides located outside of the powder bed 13. This step serves to increase the density of the Geldart Class C powder layer prior to the consolidation by the MIS flux concentrator head. After this compressive step, the entire assembly is raised above the powder bed and returned to the original starting position.

After consolidation of each powder layer, the entire bed 13 is lowered and a new layer of unsintered powder is deposited. In this manner, a solid part can be fabricated from successive layers of fused powder. To achieve a near net shape part using this method, each successive powder layer must be of a consistent, controllable thickness. Thus, it is critical that the powder be manipulated in a regular and uniform fashion in the MIS system.

The powder is deposited onto the powder bed 13 from the cylindrical powder hopper 7. The thickness of the loose powder layer can be set by the linear translation speed and the rotational speed of the blades in the hopper 7. It is very difficult to precisely meter the mass of Geldart Class C powder that is deposited on the bed directly from the powder hopper. The remaining loose, but uniform, layer is lightly compressed in a final step to facilitate consolidation by the MIS flux concentrator 17.

As noted, dispensing mechanism 21 may be mounted on Velmex bi-slide linear translation stage 5 coupled to a precision rotary platform 57. The linear stage has 300 mm of total travel and is capable of speeds as high as 40 mm per second. A precision high torque rotary stage 59 is mounted on the slide and drives the rotating blades within the cylindrical powder hopper 7.

The surface of the powder bed can be maintained at temperatures in excess of 1100° C. and consolidation of the powder is achieved by selectively heating the powder to sintering temperatures via a spatially localized high-frequency magnetic field. By maintaining the powder bed/build surface of the component at high temperature, much lower flux densities are required to consolidate the powder, which significantly reduces the power requirements of the high frequency MIS-FC power supply. The build surface consists of the metal platen 31 that is heated indirectly by the external low frequency (e.g. <100 kHz) induction heater 20. This heated build surface will not only serve to support the component during the additive manufacturing process, but will also maintain the thin layer of powder at the surface of the powder bed at or near the temperatures required for sintering.

Three independent computers control MIS system. Specifically, these computers control the: a) CNC Stage that moves the MIS Flux Concentrator over the powder bed, b) Powder dispensing mechanism that deposits powder on the powder bed, and c) 100 W RF Arbitrary Waveform Generator that powers the MIS flux concentrator.

The CNC stage can be controlled using a Probotix, Sanguinol-olu or other electronic controller. The listed controllers may control up to 4 stepper motors. The controller/stepper motor combination has an X-Y axis resolution of 0.0254 mm (0.001") and a Z axis resolution of 0.011 mm (0.00042"). The CNC system is capable of X-Y speeds up to 3800 mm/minute (150"/minute) with high precision. 3D parts and components are designed in-house using Rhinoceros, which is a stand-alone NURBS based CAD/CAM software package. These files are converted to a ".dxf" file format and uploaded to PlanetCNC USB, a software program that generates the g-code from the CAD/CAM software. The g-code file is then uploaded to the controller that converts the file into motion using the onboard CNC USB module. The g-code can be modified manually, if necessary, using the integrated editor in the PlanetCNC USB software package.

The dispensing mechanism 21 may be controlled via an RS232 interface using two, coupled Velmex VMX stepper motor controllers and a program developed in-house on a Delphi software platform.

The flux concentrator 17 is powered by commercial off the shelf RF amplifiers (ENI 3100L, or Amplifier Research 100W1000B) with an output impedance of 50Ω and operating bandwidth from 250 kHz up to 1000 MHz. These amplifiers are driven by a high frequency function generator (Rohde & Schwartz SMIQ03) capable of producing a swept high frequency sine wave from 300 kHz to 3.3 GHz. The RF amplifier is connected directly to the MIS-FC assembly via a high-power SMA cable. Using the materials properties of the powder and the measured particle size distribution with a mean particle size on the order of 300 µm, it has been determined that the optimal operating frequency of the MIS-flux concentrator to be between 50 and 100 MHz.

As described in co-assigned application Ser. No. 14/190,460 filed on Feb. 26, 2014 entitled System and Method of Additive Manufacturing incorporated herein by reference, the flux concentrator 17 is configured to apply an alternating magnetic field at the determined frequency to a portion of the first layer of the mixture using a flux concentrator 17. Material exposed to the magnetic field changes the phase of at least a portion of the first powder to liquid. The flux concentrator 17 is coupled to the X-Y-Z gantry configured to apply a concentrated magnetic field of at least one frequency between about 1 MHz and 2.0 GHz to the first powder material to melt a portion of only the first powder material. As described below, two or more particles of the first powder are combined to form a consolidated material after at least one of the particles changes to the liquid phase, the consolidated material has a size which allows for the return to solid of the liquid portion. The particles of the second powder can remain in the solid phase throughout the method.

As shown in FIGS. 2A-2F, a sleeve or cylindrical guide tube 33 is disposed about the platen 31 that is moved perpendicular to a work surface of the planar table. The bulk induction heater 20, which is configured to heat the platen 31 to elevate the temperature of the component is disposed around the cylindrical guide tube 33. This bulk induction heater is driven at a frequency much lower than the MIS coil is driven. Depending on the electrical properties of the substrate, the driving frequency for the bulk induction heater may be approximately 1 MHz or less.

The bulk induction heater 20 consists of a 25 kW induction heating power supply with an output frequency of 30 to 80 kHz, an impedance matching transformer, a water-cooled induction coil 39, and titanium platen 31 resting on an alumina support structure. This component build area is housed in a chassis that provides support for the complete powder bed was well as the inert atmosphere chamber.

Figure 2A:
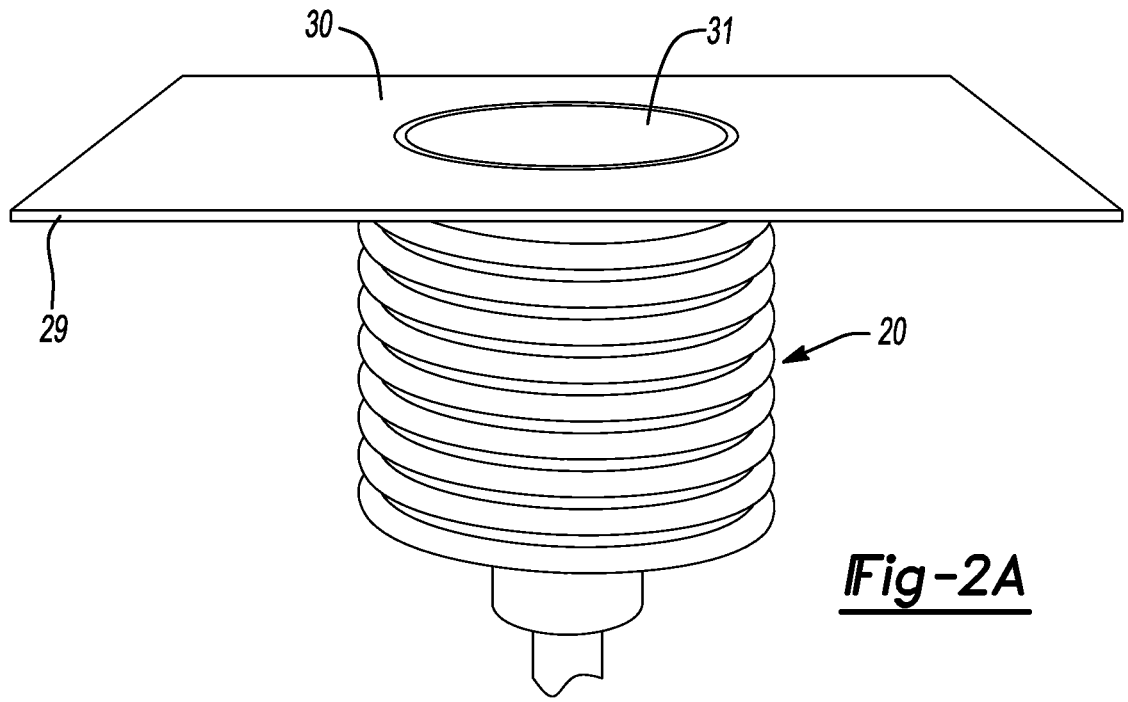
Figure 2B:
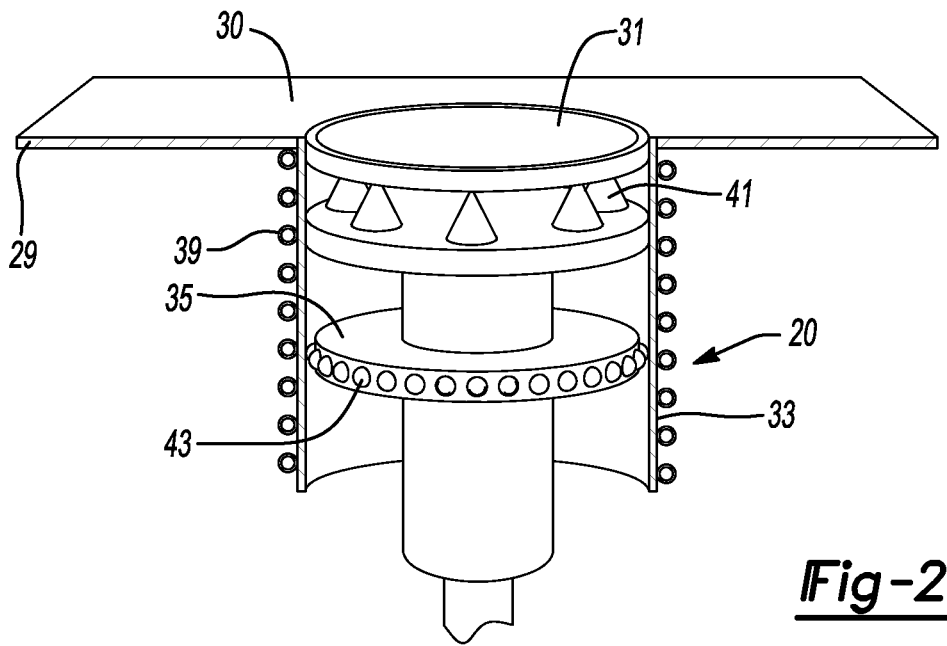

As shown in FIG. 2B, the support structure may include cylindrical guide tube 33 constructed from a refractory material such as alumina. A piston 35 disposed within the cylindrical guide tube 33 and beneath the platen 31 functions to move the platen 31 in a direction generally perpendicular to the planar surface 30 and the platen 31 to raise or lower the component being formed. The piston 35 has a plurality of support members 41 disposed between the piston 35 and the platen 31. The support members 41 are frustoconical in shape having apexes located at the intersection of the cones and the platen 31. Additionally, the piston 35 comprises a plurality of radial support member 43 disposed between the piston 35 and the cylindrical guide tube 33.

The platen 31 build surface is made of a titanium or tungsten high temperature build-plate, which is concentric with the axis of the induction coil and is at the same height as the planar alumina portion of the powder bed at the start of the build process. This high-temperature metallic platen 31 rests upon the several ceramic alumina support members 41 that are at the top of a movable high-temperature piston 35. The platen 31 is lowered during the component fabrication process as successive layers of powder are consolidated at the surface. The build-plate and component are selectively heated by the external induction heater 20 during this process. The low frequency external induction heater 20 does not heat the powder via micro induction because the skin depth at these frequencies is much larger than the particle size of the material. The powder is heated by thermal conduction. The non-conductive alumina components of the assembly are not susceptible to heating by induction and are only heated by thermal conduction through the powder in the bed assembly.

Figure 2C:
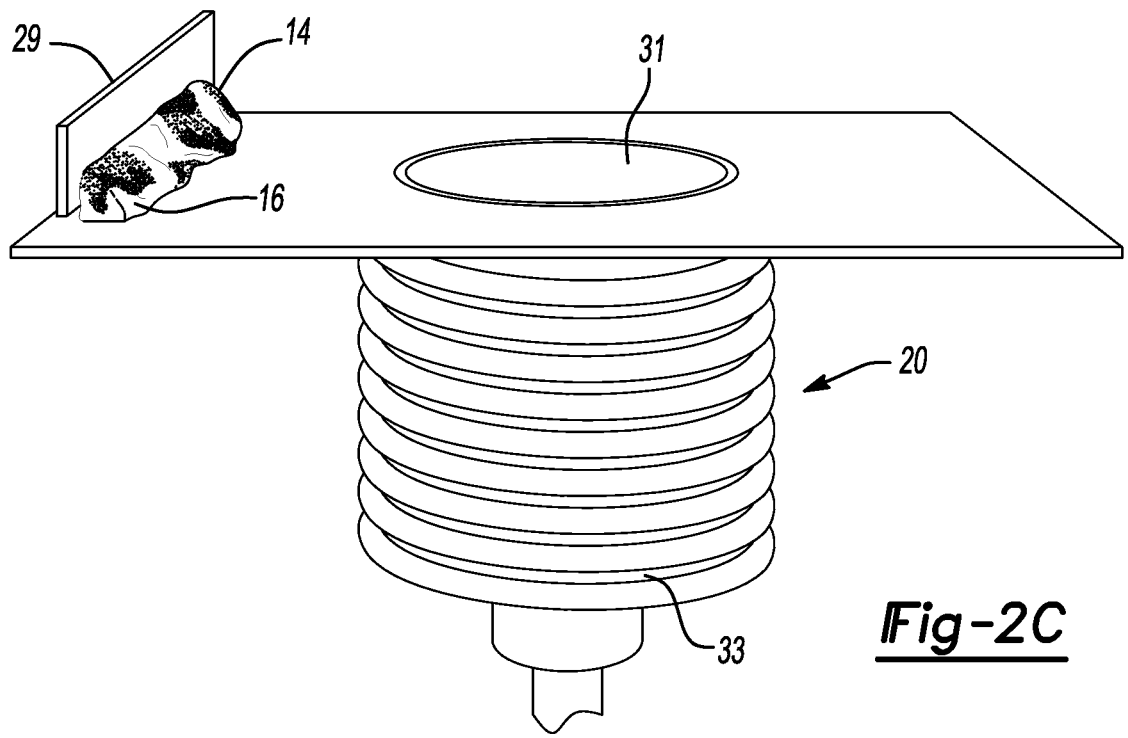
Figure 2D:
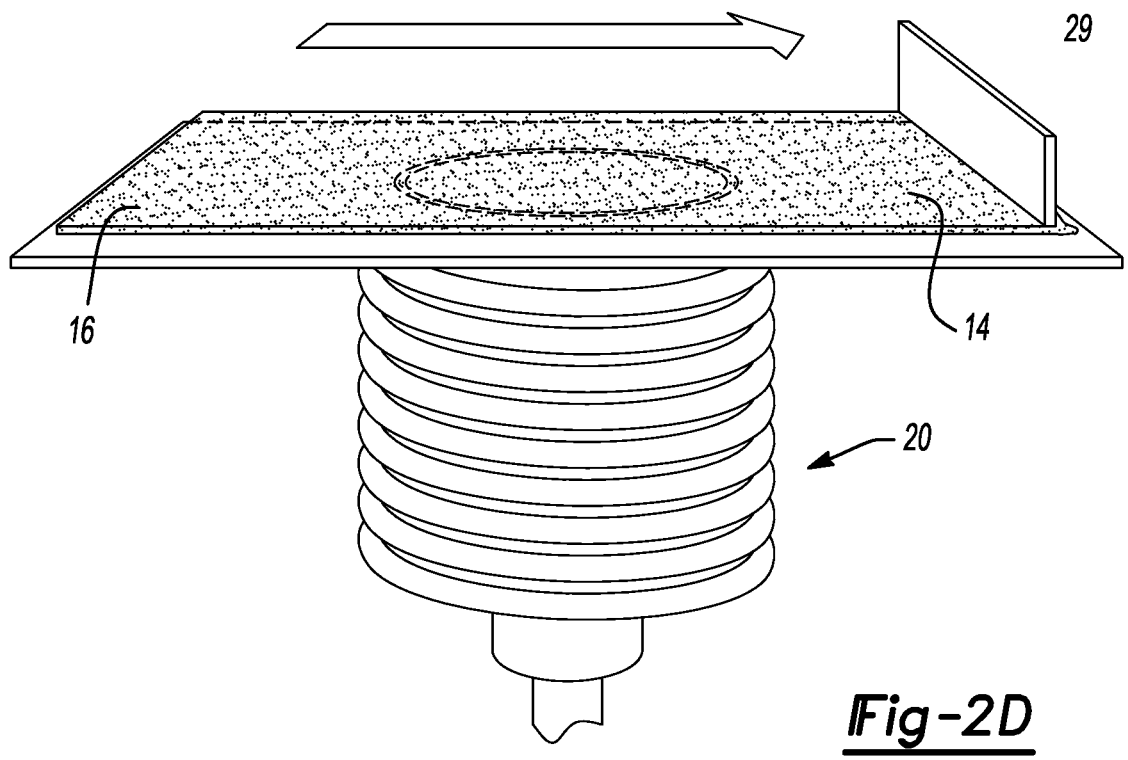

The component fabrication process is illustrated in FIGS. 2C-2F. In FIG. 2C, the platen 31 will be maintained at a fixed, elevated temperature by the external low frequency induction heater 20. A thin layer of powder will then be spread over the surface of high-temperature platen 31 by screed 8 fabricated from a tungsten plate. The layer of powder on the surface of the platen 31 is then heated rapidly by conduction and convection when in close proximity to the surface of the platen 31.

FIGS. 2E and 2F show a cross-sectional view of the high-temperature induction heated powder bed during the build process. In this schematic representation, the powder in the cylindrical alumina powder bed is shown to emphasize the selective heating of both the build-plate and the component during the fabrication process. At low frequencies, the magnetic field generated by the external induction heater 20 will only heat the consolidated material (the part), not the powder. Thus, both the build plate and the part can be maintained at or near the sintering temperatures during the build process. This is in contrast to other powder bed heating technologies in which both the powder and powder bed assembly itself must be maintained at elevated temperatures during the fabrication of a component. Here, the external induction furnace allows for the selective heating of the build-plate and the as-grown part at all times during the additive manufacturing process.

FIGS. 2E and 2F show an example build-plate heating sequence. For example, a 0.25" thick, 3" OD titanium build-plate was heated to nearly 1200° C. within about 25 seconds by the low frequency induction coil. In the induction heating process, the eddy currents flow primarily around the edge of the Ti disc in this orientation. Thus, the heating begins at the edge and moves towards the center. Even though the center of the disc is heated only through thermal conduction of the material, preliminary thermal images of the disc suggest that the temperature variation is less than approximately 50° C. If necessary, the build-plate geometry can be modified to allow for increased eddy current flow near the center of the disc assembly.

An operator determines a first frequency of an alternating magnetic field to induce an eddy current sufficient to melt only a first portion of a surface of the powder. A first alternating magnetic field at the first frequency is emitted from the MIS inductor. The alternating magnetic field is applied to a portion of the powder at a power level sufficient to melt a portion of the powder. Power is provided to flux concentrator 17 at a frequency between 10 MHz and 2.0 GHz. A second alternating magnetic field is applied to a portion of the platen at a power level sufficient to heat the platen. After consolidation by the flux concentrator, the platen 31 is lowered a fixed distance and the process repeats itself.

The powder dispensing mechanism 21 is configured to apply a second layer of a powder mixture over the first layer, and the flux concentrator 17 is configured to apply the concentrated magnetic field to the second layer of a powder mixture. The magnitude of power absorbed by the first powder material is proportional to the resistivity and dimensions of a particle within the first powder material. Portions of the solidified and previously melted first material encapsulate portions of the second powder material and material properties of the second powder material remain unchanged after solidification of the first powder material.

Unlike laser or electron beam based additive manufacturing techniques in which the metal powder is heated indiscriminately by an external energy source, the system 10 uses micro-induction sintering for the selective heating of individual particles by tailoring the frequency of an applied magnetic field. During micro-induction sintering, the system 10 applies a localized high frequency magnetic field produced over an upper surface of the powder bed using the flux concentrator 17. System 10 causes a rapid heating of individual particles followed by a rapid cooling of the consolidated material due to a decoupling of the high frequency magnetic field from the melted particles that no longer exhibit the particle size being excited.

Heating of metallic particles within the mixture of powders 12 by induction is a result of both Joule heating due to eddy currents in non-magnetic metallic particles and hysteresis loss in magnetic particles, both of which result from the application of a high frequency magnetic field. For non-magnetic metals, eddy currents flow within a certain distance from the surface of the material.

$$\delta = \sqrt{\frac{\rho}{\pi f \mu}} \qquad [1]$$

The distance within the metal at which the eddy current is reduced to approximately 37% of the value at the surface is called the skin depth $\delta$ and can be written as where $\rho$ is the resistivity and $\mu$ is the permeability of the material, and f is the frequency of the magnetic field. In order to completely heat a metal particle by induction, the particle is immersed in a high frequency magnetic field such that the skin depth is approximately one half the diameter of the particle. Generally, high power transfer to the particle occurs near a diameter approximately four times the skin depth for simple geometries such as plates and cylinders with the magnetic field parallel to the axis of the part. For spheres, it is expected this ratio of the particle diameter to the skin depth would be higher.

Figure 3C:
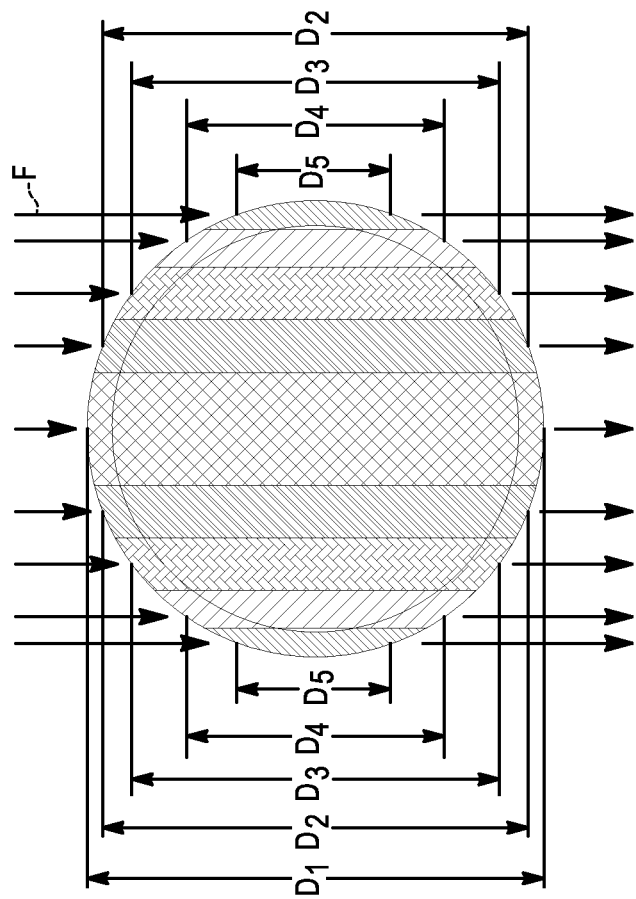
FIGS. 3A-3D represent the application of micro induction heating to particles according to the present teachings.
Figure 3B:
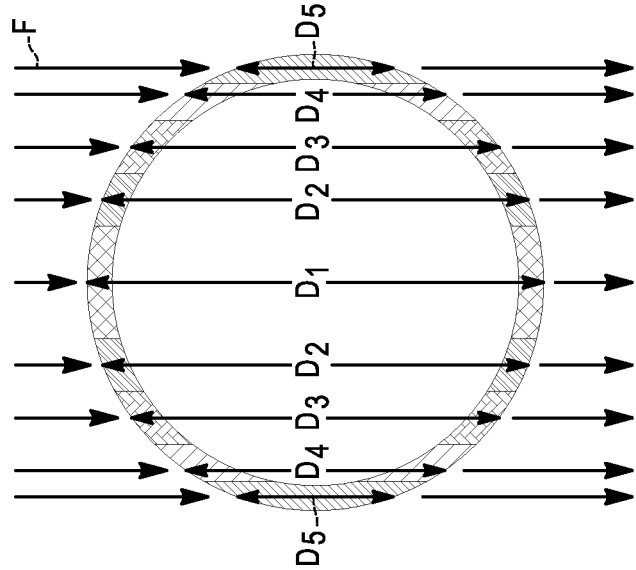
Figure 3A:
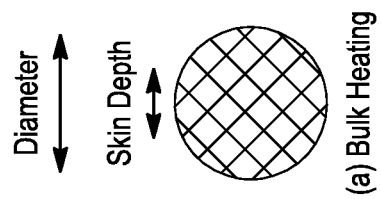

FIG. 3A depicts the heating of a single particle, by induction. The diameter of the particle is approximately 2$\delta$. In this case, the eddy currents penetrate deep into the particle and bulk heating of the entire particle occurs by induction and heat transfer through the particle at a single frequency. Due to particle size distributions as well as particle shape anomalies, a band of frequencies is preferred to sinter a mixture of powders 12.

FIG. 3B depicts when the diameter of the particle is much larger than δ. Due to the directional nature of the magnetic field, only a portion of the particle outer skin is melted corresponding to the skin depth δ. For given resistivity and particle sizes, the melting can occur either only at the surface or through an entire circular layer of the particle (see FIG. 3C). A band of frequencies can be applied to correspond to various hemispherical diameters $D_1$-$D_5$ at different circles of the sphere. In the examples depicted in FIGS. 3B and 3C, the frequencies applied can vary from 1 to about 5 times the frequency calculated to melt the largest diameter for a given particle having a specific resistivity.

FIG. 3C depicts when a band of frequencies are applied to melt a set of cylindrical disks through the particle. In this example, $D_1$-$D_5$ correspond to frequencies which form a skin depth of approximately 2δ. Optionally, to melt the particle, the frequency band of the magnetic field F need not completely cover each of the frequencies corresponding to diameters $D_1$-$D_5$. Melting of the whole or a sufficient portion of the particle can occur by applying frequencies corresponding to skin depths, for diameters $D_2$ and/or $D_3$, where melting the entire particle, or surface of the particle occurs through heat conduction. The heat energy required to melt the remainder of the particle transfers through the particle via normal heat diffusion processes.

Figure 3D:
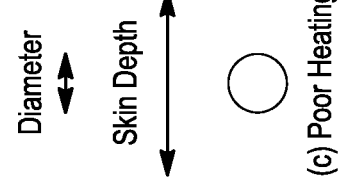

In FIG. 3D, the skin depth is much larger than the diameter of the particle and the eddy currents largely cancel in the particle. In this case, the particle does not couple well to the alternating magnetic field and the material absorbs very little power. It is envisioned the system would use frequencies such that the heating would be completed as shown in FIGS. 3A-3C. There is little heating of the particle at frequencies depicted in the case shown in FIG. 3D.

For simple shaped (e.g. flat or cylindrical) materials placed in a uniform alternating magnetic field, the power absorbed by the particle $P_w$ can be:

$$P_w = \frac{\rho}{\delta} AKH^2 = AKH^2 \sqrt{\pi f \mu \rho} \quad [2]$$

Where ρ is the resistivity of the material, δ is the skin depth, A is the particle surface area exposed to the magnetic field, K is a power transfer factor that depends on particle geometry, and H is the magnetic field strength. It should be noted that resistivity changes as a function of temperature and, as such, it is envisioned that the Pw may be adjusted through time depending upon changes in static and dynamic thermal conditions during the formation of a component. It is possible to calculate the power absorbed by a given metallic particle in an induction heating process using modern finite element analysis methods. As a rule of thumb, with a fixed resistivity, magnetic permeability and particle dimensions, the power absorbed by the particle in an induction heating process increases with increasing frequency and magnetic field strength.

The only ill-defined quantities are A and K, which describe how well the high frequency magnetic field couples to the individual particle. For any given slice through an approximately spherical particle, d/δ can be calculated from the particle diameter at that slice. The power transfer factor K, on the other hand, depends on the "electrical dimension" of the portion of the particle being heated, which is defined as the ratio of the diameter of the particle to the skin depth, d/δ.

Figure 4:
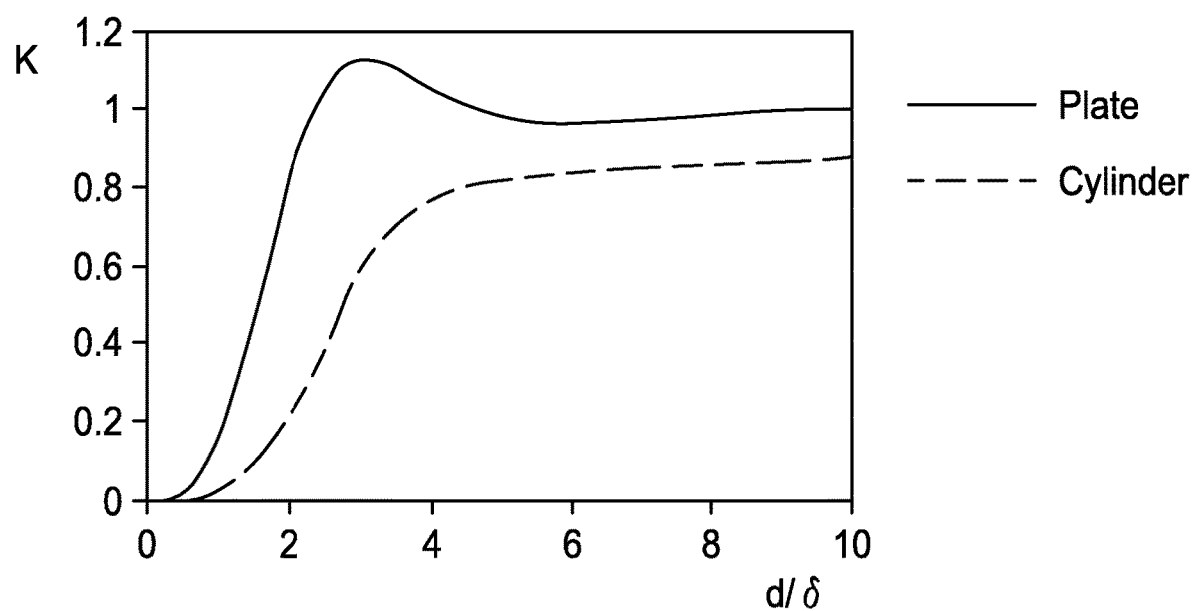
FIG. 4 represents a graph representing power transfer factors for a material subjected to micro induction heating.

FIG. 4 represents a graph representing power transfer factors for materials subjected to micro induction heating. Power transfer factors for two cases of a plate and a cylinder are shown. Using the plate geometry as a crude model for roughly spherical particles, it is seen that K approaches unity if the skin depth is much smaller than the thickness of the particle. For example, when d~2δ, K is approximately 0.8. The system utilizes the functional dependence of K(d/δ) for determining the appropriate frequency or frequencies for the selective heating of individual particles in a composite material. The system 10 utilizes two conceptual composite architectures with an emphasis on the selective heating of individual components of the composite component during the consolidation process. Accordingly, the selectivity of the system's micro-inductive sintering is based both on the size and material properties of the particles in the powder.

Figure 5C:
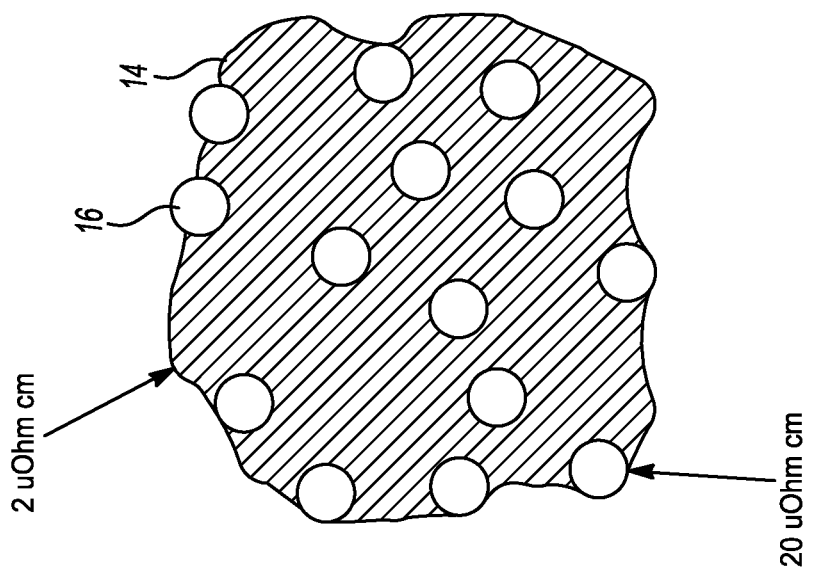
FIGS. 5A-6C represent micro induction sintering according to the present teachings.
Figure 5B:
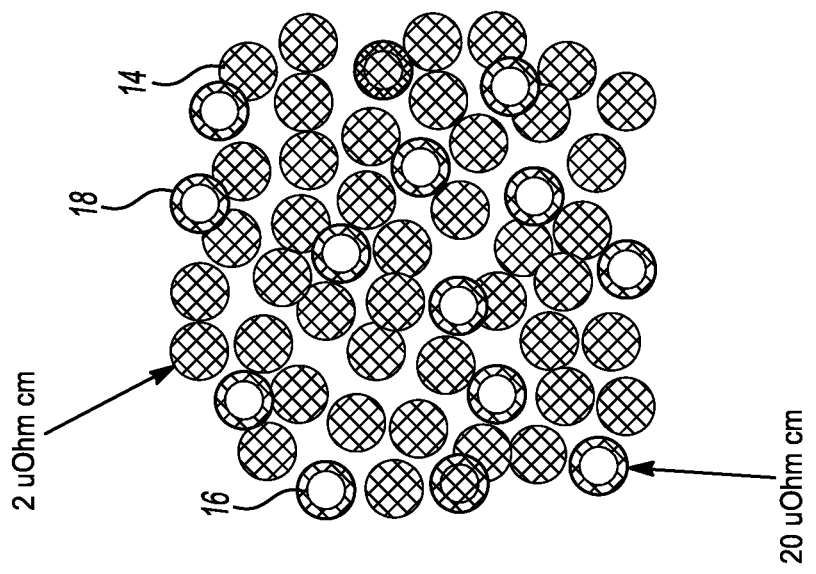
Figure 5A:
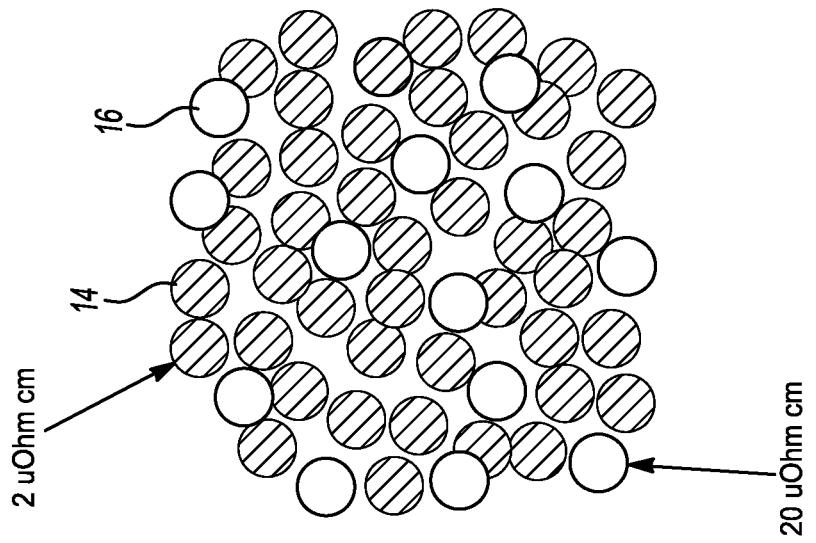

FIGS. 5A-5C illustrate the application of micro-inductive sintering to a mixture of two mono-sized dispersed metal powders. In FIG. 4A, the powder mixture 12 consists of a first material 14 and a second material 16 with approximately the same particle size or particle size distributions, but with different material properties. The resistivity ρ of the particles of the first material 14 is ten times greater than the resistivity of particles of the second material 16. Assuming that bulk heating of the particles occurs when d/δ equals 4, the induction frequency can be:

$$f = \frac{16\rho}{\pi \mu d^2} \quad [3]$$

where d is the diameter of the particle.

Thus, for a given particle size and magnetic permeability, the induction frequency to achieve bulk heating of a particle scales linearly with the resistivity of the material. In this case, the particles of the first material 14 can be selectively heated in bulk using an oscillating magnetic field with a frequency ten times smaller than that which would be used to bulk heat the particles of the second material 16. This is illustrated in FIG. 5B, which explicitly shows the selective bulk heating of the particles of the first material 14 as indicated by double cross-hatching. FIG. 5B depicts the heating of the particles of the first material 14 where the frequency of the magnetic field is set such that the skin depth is approximately one half the diameter of the particle.

The skin depth of the particles of the second material 16 is approximately $(10)^{0.5}$~3.2 times that of the first particle at this frequency. Since the skin depth in the second particle is much larger than the particle diameter, there is very poor coupling to the high frequency magnetic field and these particles are not heated directly by induction. Note that the particles of the second material 16 are also heated in this process, but only by conduction and convection heating which results from the induction heating of the particles of the first material 14. As such, only an outer portion 18 of the particles of the second material 16 are heated as depicted by double cross-hatching. The selective sintering of powders that possess similar particle size distributions, but different materials properties can be used to inform the power levels and frequencies needed for micro-inductive sintering.

FIG. 5C represents a portion of a consolidated component 11 where the previously heated and melted particles of the first material 14 have now cooled after completion of the selective sintering process. It should be noted that the isolated particles of the second material 16 remain as inclusions within the recently formed solid of the first material 14. Upon consolidation of the particles of the first material 14, the effective domain size of the first material 14 increases such that the high frequency magnetic field tuned to the initial diameter of the particles of the first material 14 no longer couples well to the first material 14. In this case, the effective particle size is much larger than the skin depth at this frequency and the entire consolidated domain is heated only at the surface as previously described in relation to FIG. 5B.

In one exemplary manufacturing method, the bed 13 of the mixture of powder 12 may be heated to a temperature near the melting temperature of the particles of the first material 14. Only the very low overall additional energy needed to melt the powder 12 need be input into the powder bed 13 by the flux concentrator 17 to selectively melt the particles of first material 14. The additional energy is localized to the active micro-inductive sintering zone near a gap 23 in the flux concentrator 17. For example, high frequency induction of eddy currents in a metallic binder (particles of the first material 14) allows for the selective heating and subsequent consolidation of a ceramic/metal matrix composite without the associated heating and degradation of the ceramic constituent (particles of the second material 16). This makes it possible to consolidate composites composed of very heat-sensitive ceramic particles (e.g., superconducting materials).

The coupling and de-coupling of the high frequency magnetic field based on the domain size of the metallic material is a unique and novel feature specific to the micro-inductive sintering process of the present disclosure. This property allows for real-time diagnostics of the micro-inductive sintering consolidation process through the monitoring of the forward and reflected power to the powder bed. In addition, this process allows for the rapid and automatic de-coupling of the external heat source (i.e. the high frequency magnetic field) upon consolidation of the particles. This is a desirable control feature in the consolidation of heat sensitive materials or composite materials that may degrade upon exposure to elevated temperatures.

As previously stated, the selectivity of the system's micro-inductive sintering is based both on the size and material properties of the particles in the powder. The metal powder shown in FIG. 6A consists of a bimodal distribution of first particles 22 and second particles 24. The second particles 24 are the larger of the two particles having approximately twice the diameter of the smaller first particles 22. Again, either the smaller or larger particles may be selectively heated by the induction frequency, where it is seen that the induction frequency varies as a function of size. Thus, a twofold increase in particle size implies a fourfold decrease in the frequency of the oscillating magnetic field necessary to achieve bulk heating, assuming the optimum "electrical dimension" for heating the particles was equal to 2.

Figure 6C:
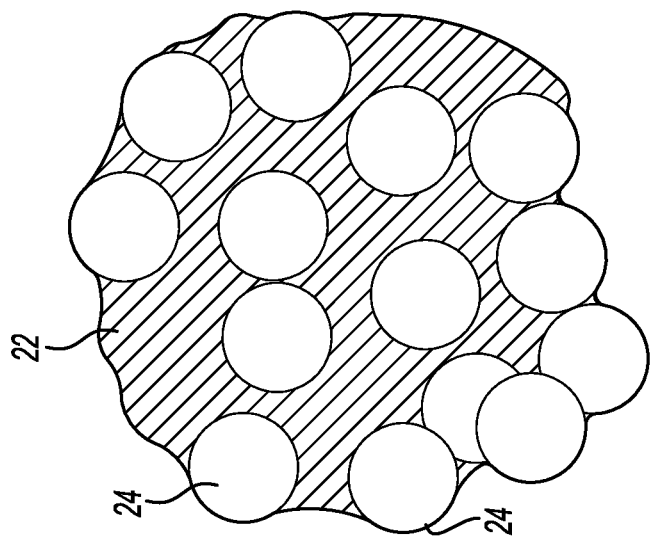
Figure 6B:
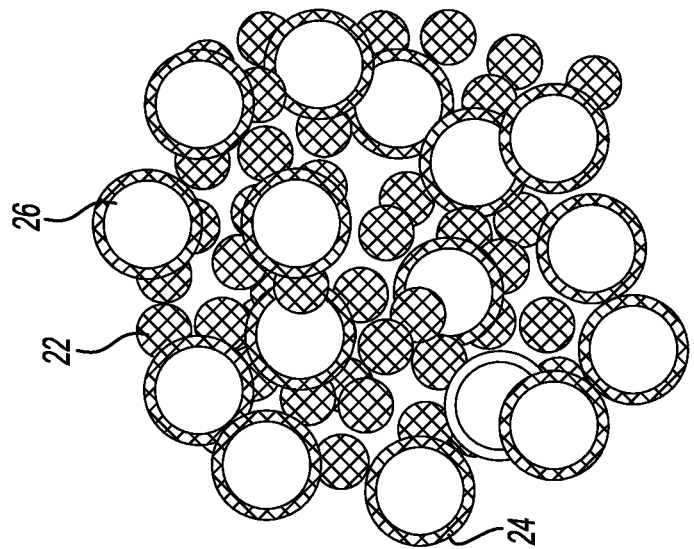
Figure 6A:
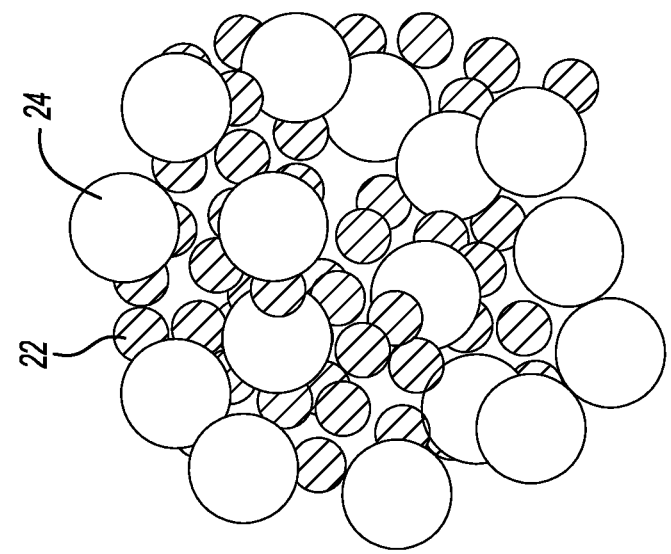

FIG. 6B illustrates the bulk heating of the smaller first particles 22 and the surface heating of an outer portion 26 of larger second particles 24 which is characteristic of the micro-inductive sintering process. Using a narrow bandwidth of fixed frequencies, complete consolidation of the effected region is shown in FIG. 6C. As in the previous example, upon consolidation of the particles, the effective domain size of the material increases and the high frequency magnetic field tuned to the initial diameter of the smaller first particles 22 becomes de-coupled from the consolidated material and the entire domain is heated by induction only at the surface.

In the composite architectures previously described, the frequency of the induction heating process is used to selectively heat specific components of the composite based on the physical or materials characteristics of the powder. In the prior example, the small first particles 22 are selectively heated by induction, which results in the consolidation of the material. By changing the frequency or spectrum of the magnetic field, however, the large particles could have been selectively heated by induction, which may lead to an improved density of the final part. In practice, the specific sintering characteristics of the material and the desired material properties of resultant material will determine the micro-inductive sintering frequency spectrum. Overall, the micro-inductive sintering approach allows for enhanced control of the densification process by targeting small particles, or large particles that can be partially or entirely melted. This control adds another tool in the toolbox for the effective consolidation of powders suitable for use in additive manufacturing.

By selective application of the magnetic fields, micro induction sintering produces complex parts and components directly from advanced metal and ceramic/metal matrix composite powders. The micro-inductive sintering process, however, is not without limitations imposed by the system electronics, the magnetic properties of the magneto-dielectric material used to fabricate the flux concentrator 17, the specific sintering characteristics of the metallic powders, and the fundamental physics of induction heating. In general, the micro-inductive sintering processing is preferable within the following operational parameters: 1) Materials with electrical resistivity between 1 μOhm cm and 200 μOhm cm; 2) Powders with particle sizes between 1 μm and 400 μm; and 3) Flux concentrator induction frequencies between 1 MHz and 2000 MHz.

Figure 7:
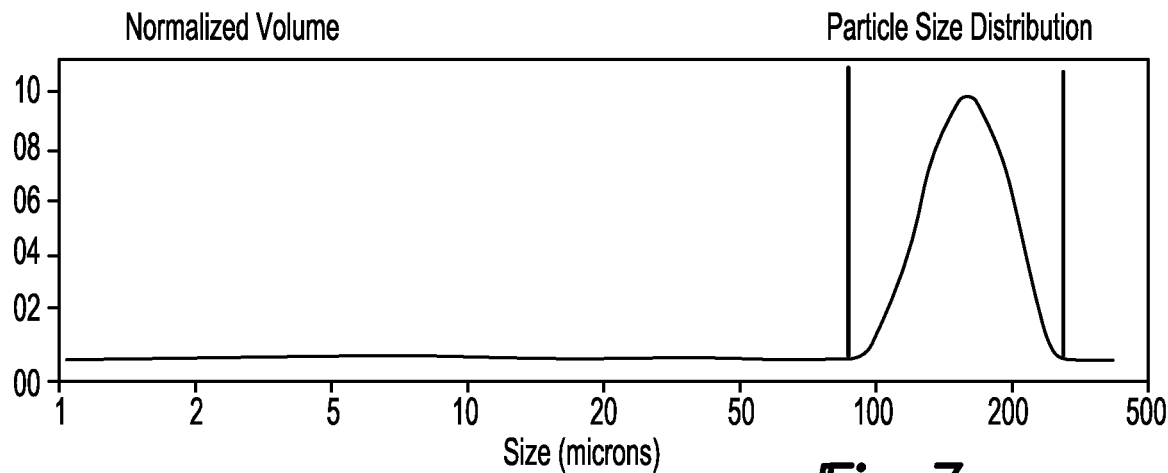
FIG. 7 depicts a simulated powder size distribution.

By way of non-limiting example, the sintering of a Ti-48Al-2Nb-2Cr powder, produced by TLS Technik GmbH & Co., is described below. FIG. 7 shows a simulated particle size distribution for the powder based on information obtained from the supplier. The simulated particle size distribution is used to determine the frequency range of the micro-inductive sintering power supply and design the high-power micro-inductive sintering flux concentrator circuit. Technical alloys, with high resistivities and high melting temperatures, present some unique challenges in the design of the overall micro-inductive sintering system.

Figure 8A:
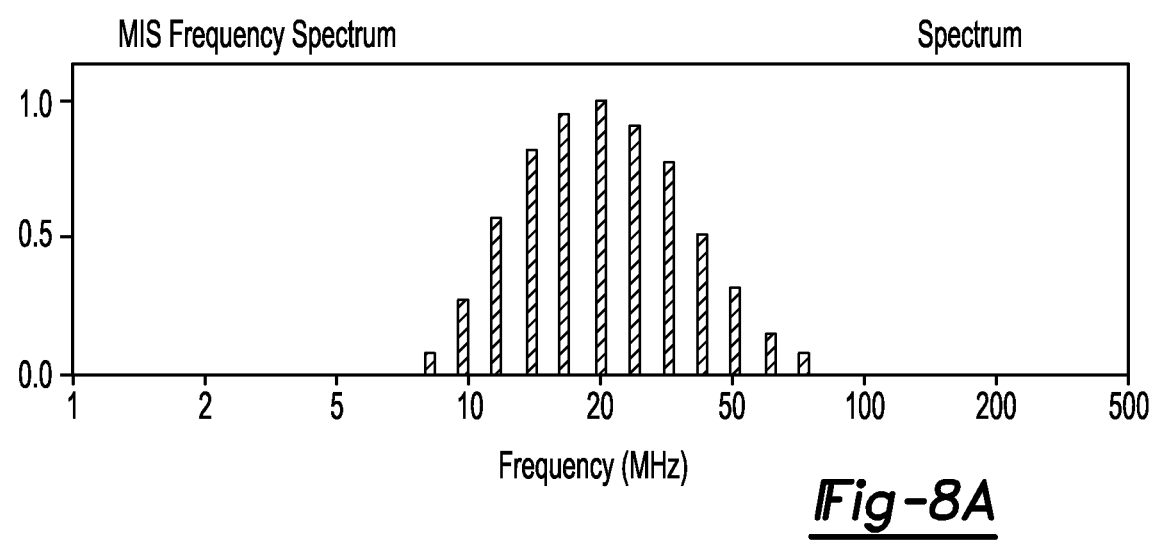
FIGS. 8A and 8B show calculated induction heating spectrums for a powder having the distribution shown in FIG. 7.

FIG. 8A shows the calculated induction heating spectrum for the powder using an estimated room temperature resistivity of 100 μΩ-cm and the d/δ~4 criterion. The frequency spectrum is calculated for particles with diameters between about 90 and 210 microns, and illustrates that a very broad frequency spectrum (e.g. ~10 to 60 MHz) is required to heat a powder with a relatively narrow (e.g. 100 to 300 μm) particle size distribution. The induction heating spectrum was calculated using the room temperature resistivity of 100 μΩ-cm. As the powder reaches sintering temperatures, however, the electrical resistivity and skin depth of the material will increase as prescribed by Equation [1]. Thus, in order to efficiently heat the particles at elevated temperatures, the induction heating spectrum must be shifted to higher frequencies. Optionally, this frequency shift can occur during processing of the component.

Figure 8B:
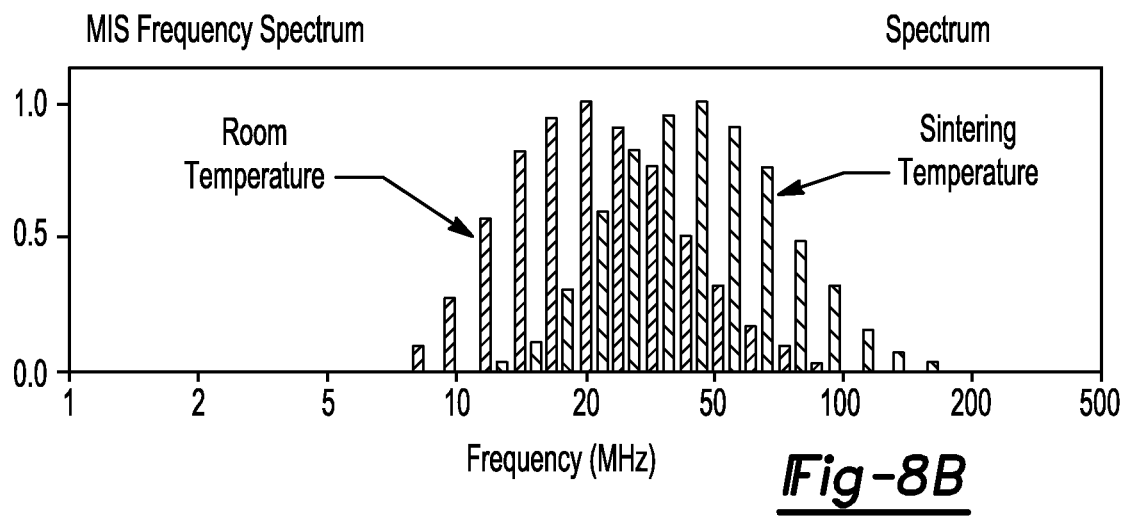

FIG. 8B depicts a calculation of the induction heating spectrum of the alloy at room temperature (i.e. 100 μΩ-cm) and the same material at sintering temperatures (i.e. 200

µΩ-cm). There is a significant shift to higher frequencies as the resistivity of the particles increases with temperature. Similarly, due to changes in the distribution of diameters of portions of the powder melted (see FIG. 2B), a frequency band representing 1-5 times the frequency calculated in equation [1] or portions can be used to melt the particles.

The micro-inductive sintering process is tightly coupled to the electrical and physical properties of the metal powder. These specific materials characteristics can be taken into account in the design of the micro-inductive sintering flux concentrator and the associated RF electronics. In essence, the material to be consolidated determines the characteristics of the micro-inductive sintering system. For example, with a given resistivity and particle size distribution of a material, the operating bandwidth of the micro-inductive sintering system can be determined. This operating bandwidth then determines: the materials, inductance, and conductor geometry of the micro-inductive sintering flux concentrator which can be, for example, a magneto-dielectric material micro-inductive sintering flux concentrator (0.5 to about 3 MHz); a ferrite-based micro-inductive sintering flux concentrator (1 to about 50 MHz); or an air-core micro-inductive sintering flux concentrator (1 MHz to about 2.0 GHz). The micro-inductive sintering flux concentrator circuit drive topology can be, for example, a high-order ladder network (low power, medium bandwidth); a resonant tank circuit (high power, narrow bandwidth); or a variable tank circuit (medium power, wide bandwidth).

Figure 9:
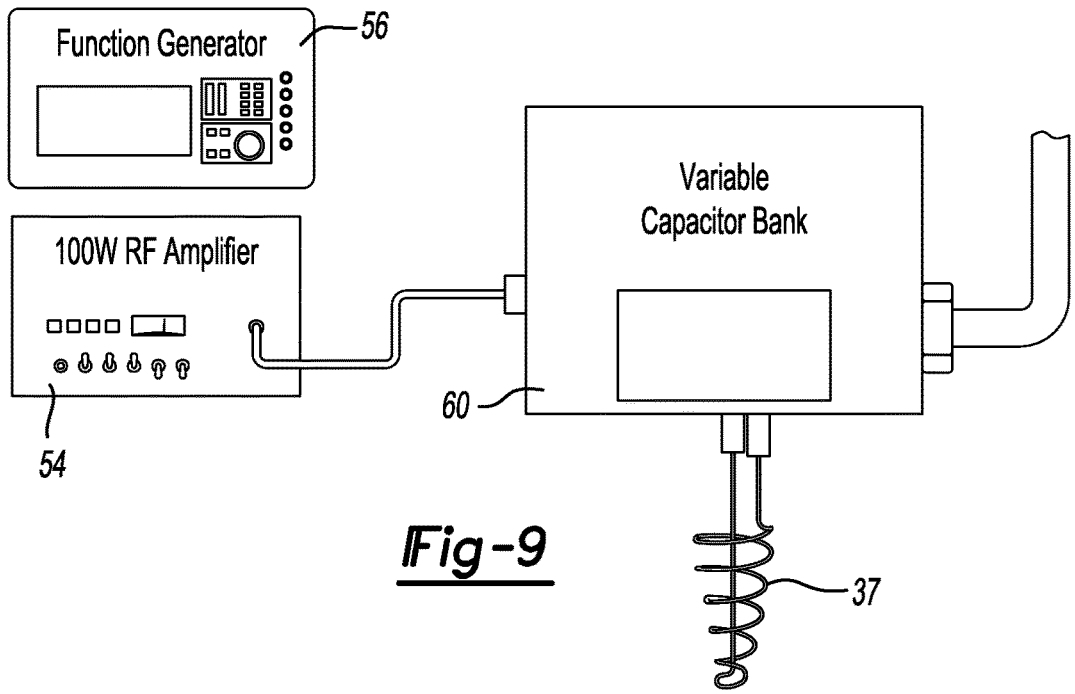
FIG. 9 represents a block diagram of the driving circuit for the micro-inductive sintering flux concentrator.
Figure 10:
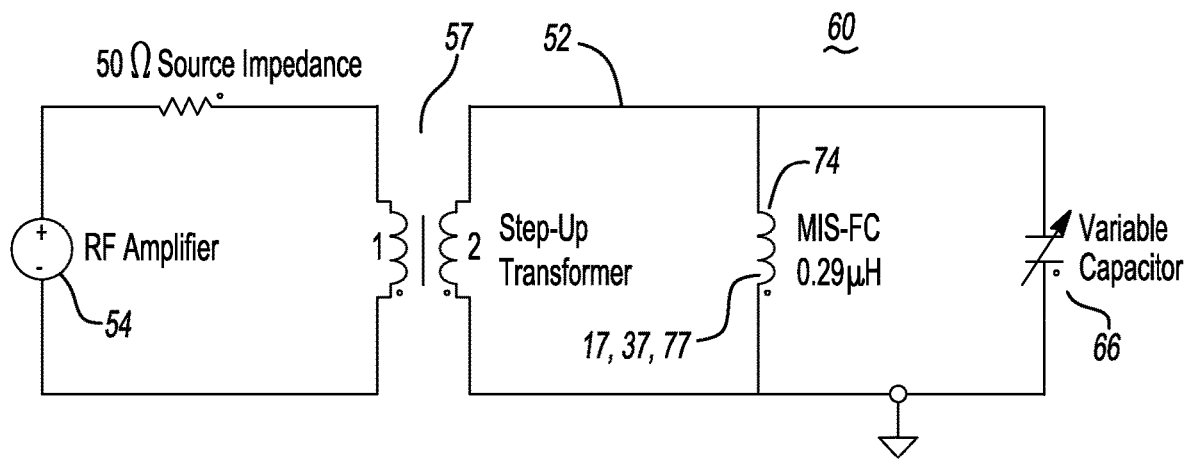
FIG. 10 represents a schematic resonant tank circuit configured to drive a flux concentrator.

A micro-inductive sintering flux concentrator system for the additive manufacturing system 10 is shown in FIGS. 9 and 10. The micro-inductive sintering flux concentrator system includes the RF signal generator 56 which can include a high frequency function generator (Rohde & Schwartz SMIQ02) capable of producing a swept high frequency sine wave from 300 kHz to 2.2 GHz. The output of the RF signal generator 56 is driven by a 100 W RF amplifier 54 (Amplifier Research 100W1000B) with a series impedance of 50Ω. The amplifier 54 is connected to a flux concentrator 37 (optionally, 17 and 77) that includes an inductor 74 parallel to a variable capacitor bank 66. As is typical in resonant tank circuits, all current leads between the inductor 74 coil and the variable capacitor 66 should be as short as possible to both minimize the stray inductance of the assembly and reduce any resistive losses. Alternatively, discrete capacitors, which could be inserted or removed from the tank circuit 60 using a high speed switching circuit, can be used. A selection of SuperChip multilayer capacitors available from American Technical Ceramics that can be used up to 500 MHz at approximately 1.5 kV. American Technical Ceramics also has high power RF capacitors that can function well above 3 GHz.

The variable capacitor 66 can be a bank of capacitors that are selectively combined to give a varying capacitance to the tank circuit. Alternatively, the variable capacitor can be an open air capacitor having interposed movable plates (not shown). Adjusting the capacitance of the variable capacitor 66 varies the resonant frequency of the circuit 60 (see FIGS. 10 and 11A-11B) and, as such, the frequency of the magnetic field applied to the powders 12. In a tank circuit 60 with a series of discrete capacitors, the resonant frequency is be fixed by the value of the capacitance inserted into the circuit 52. While more complex than the variable tank circuit 60 with the flux concentrator 37, the fixed-frequency resonant tank circuit 60 has the advantage of high speed operation at very high frequencies.

The driving tank circuit 60 can deliver approximately 5 A (peak) to the spiral coil inductor 74 of the micro-inductive sintering flux concentrator 37. The coil inductor 74 possess a bandwidth between 10 MHz to approximately 1400 MHz and can be "tunable" within that bandwidth to maximize current flow to the micro-inductive sintering flux concentrator 17 while minimizing the power draw from the RF amplifier 54.

This circuit 60 is intended to maximize the current flow to the micro-inductive sintering flux concentrator 17, 37, 77 at resonance, and also contributes to the real-time diagnostic features of the micro-inductive sintering process that is described in detail below. If the resonant frequency of the tank circuit 60 does not couple well with the particle size distribution of the powder (see Equation [3]), then there is no real resistive load in the tank circuit 60 and only reactive currents flow in the tank circuit 60. In this case, little power is drawn from the RF amplifier 54. If the resonant frequency of the circuit 60 couples well with the particle size distribution of the mixture of powder 12, however, a resistive load is introduced in the tank circuit 60 and power will be drawn from the amplifier 54. In principle, real power flows in the tank circuit 60 only when the induction heating frequency (i.e. $f_R$) is such that the "electrical dimension" d/δ is large (see Equations [1] and [2]). The frequency dependence of the real power provided by the RF amplifier 54 using this circuit design can be directly related to the real-time diagnostics and qualification of the micro-inductive sintering method. In this way, a parameter defining the quality of a sinter or component can be defined.

Generally, the strength of the magnetic field geometrically changes with distance from the tip of the micro-inductive sintering flux concentrator 17, 37, 77.

A micro-inductive sintering flux concentrator system for the additive manufacturing system 10 is shown in FIGS. 9 and 10. The micro-inductive sintering flux concentrator system includes the RF signal generator 56 which can include a high frequency function generator (Rohde & Schwartz SMIQ02) capable of producing a swept high frequency sine wave from 300 kHz to 2.2 GHz. The output of the RF signal generator 56 is driven by a 100 W RF amplifier 54 (Amplifier Research 100W1000B) with a series impedance of 50Ω. The amplifier 54 is connected to a flux concentrator 37 (optionally, 17 and 77) that includes an inductor 74 parallel to a variable capacitor bank 66. As is typical in resonant tank circuits, all current leads between the inductor 74 coil and the variable capacitor 66 should be as short as possible to both minimize the stray inductance of the assembly and reduce any resistive losses. Alternatively, discrete capacitors, which could be inserted or removed from the tank circuit 60 using a high speed switching circuit, can be used. A selection of SuperChip multilayer capacitors available from American Technical Ceramics that can be used up to 500 MHz at approximately 1.5 kV. American Technical Ceramics also has high power RF capacitors that can function well above 3 GHz.

The variable capacitor 66 can be a bank of capacitors that are selectively combined to give a varying capacitance to the tank circuit. Alternatively, the variable capacitor can be an open air capacitor having interposed movable plates (not shown). Adjusting the capacitance of the variable capacitor 66 varies the resonant frequency of the circuit and, as such, the frequency of the magnetic field applied to the powders 12. In a tank circuit 60 with a series of discrete capacitors, the resonant frequency will be fixed by the value of the capacitance inserted into the circuit 52. While more complex than the variable tank circuit 60 with the flux concentrator 37, the fixed-frequency resonant tank circuit 60 has the advantage of high speed operation at very high frequencies.

The driving tank circuit 60 can deliver approximately 5 A (peak) to the spiral coil inductor 74 of the micro-inductive sintering flux concentrator 37. The coil inductor 74 possess a bandwidth between 10 MHz to approximately 1400 MHz and can be "tunable" within that bandwidth to maximize current flow to the micro-inductive sintering flux concentrator 17 while minimizing the power draw from the RF amplifier 54.

This circuit 60 is intended to maximize the current flow to the micro-inductive sintering flux concentrator 17, 37, 77 at resonance, and also contributes to the real-time diagnostic features of the micro-inductive sintering process that is described in detail below. If the resonant frequency of the tank circuit 60 does not couple well with the particle size distribution of the powder (see Equation [3]), then there is no real resistive load in the tank circuit 60 and only reactive currents flow in the tank circuit 60. In this case, little power is drawn from the RF amplifier 54. If the resonant frequency of the circuit 60 couples well with the particle size distribution of the mixture of powder 12, however, a resistive load is introduced in the tank circuit 60 and power will be drawn from the amplifier 54. In principle, real power will flow in the tank circuit 60 only when the induction heating frequency (i.e. $f_R$) is such that the "electrical dimension" d/δ is large (see Equations [1] and [2]). The frequency dependence of the real power provided by the RF amplifier 54 using this circuit design can be directly related to the real-time diagnostics and qualification of the micro-inductive sintering method. In this way, a parameter defining the quality of a sinter or component can be defined.

The circuit 60 diagram for a 75 MHz micro-inductive sintering flux concentrator is shown in FIG. 11. In this circuit 60, the degree of coupling between the micro-inductive sintering flux concentrator 17, 37, 77 and the powder 12 is explicitly described by the mutual inductance, M. Here, M is a function of the surface area of the particles exposed to the high frequency magnetic field and the skin depth of the metallic powder at the resonant frequency of the tank circuit 60. If the micro-inductive sintering flux concentrator 17, 37, 77 is too distant from the metal powder, or the skin depth is much larger than the particle size, M will tend to zero and the only load in the tank circuit 60 will be due to the intrinsic AC resistance of the material of the inductor, $L_1$. The reactive current in the tank portion of the tank circuit 60 (i.e. between the capacitor and the micro-inductive sintering flux concentrator inductor 74) is sharply peaked at the resonant frequency, which can be shown to be:

$$f_R = 1/(2\pi\sqrt{LC}) \quad [4]$$

where L is the inductance of the micro-inductive sintering flux concentrator (L1) and C is the capacitance of the variable capacitor 66 (C1) in parallel to L. At $f_R$, very large reactive currents flow between the capacitor bank 66 and the micro-inductive sintering flux concentrator 17, 37, 77 but the only power dissipated in the tank circuit 60 is due to the resistive loss in R1 and R3 when K is zero. With a non-zero M, increased power is drawn from the amplifier 54 as power flows to the metal powder bed $L_2$, $R_2$. In general, the magnitude of these resistive and reactive currents depends on the voltage available from the amplifier 54 and the reactive current available from the capacitor at fr.

The micro-inductive sintering flux concentrator tank circuit 60 minimizes the power draw from the RF amplifier 54 by operating near the resonant frequency at all times. In principle, this increased power will flow in the circuit only when the induction heating frequency (i.e. fr) is such that the "electrical dimension" d/δ is large. The frequency dependence of the real power provided by the amplifier 54 can be directly related to the real-time diagnostics and qualification of the quality of the micro-inductive sintering method and a produced component. Additionally, it can be used to test the quality of the powder being sintered.

A convenient method to determine the power transfer from a source to a load is to measure the Voltage Standing Wave Ratio (VSWR) of the flux concentrator 17. The VSWR is a measure of the amplitude of the reflected RF wave relative to the incident RF wave between an RF power supply and a device under test. In general, the VSWR can be calculated by measuring the reflection coefficient Γ of the sintering flux concentrator 17, which can be written as, $$\Gamma = \frac{V_{reflected}}{V_{incident}}$$

where;

$$VSWR = \frac{1+|\Gamma|}{1-|\Gamma|}$$

is the voltage of the reflected and incident waves, respectively. As Γ is always between 0 and 1, the VSWR has a minimum of unity, which corresponds to 100% power transferred from the source to the load, which corresponds to approximately 64% of the power transferred to the load with 36% reflected back to the power supply.

A block diagram of the VSWR measurement system 96 is shown in FIG. 12. The VSWR of micro-inductive sintering flux concentrator components is directly measured in order to confirm the operation of these components for use in the micro-inductive sintering system. This calculation can be used to determine a quality parameter for the powder, the equipment, or raw materials. The system consists of an RF signal generator 56, amplifier 54, dual directional coupler 62, and two spectrum analyzers 64. The RF signal generator 19 drives a known RF sine wave to the amplifier 54, which is connected to the micro-inductive sintering flux concentrator 17, 37, 77 through a dual directional coupler 62.

The RF power available from the forward and reflected ports on the dual directional coupler correspond to the incident and reflected power to the micro-inductive sintering flux concentrator 17, which are measured by the two spectrum analyzers 64, respectively. The square root of the ratio of the reflected and incident power is equivalent to Γ from which the VSWR ratio is calculated. The VSWR measurements are completely automated by a control code micro-inductive sintering system which can be used as a quality measure or a control signal in the additive manufacturing system 10.

Optionally, the VSWR measurement system 96 is configured to calculate a measurement of a change in power transferred to the powder 12 during a phase change in the powder. To do this, the VSWR measurement system 96 is configured to measure or calculate a change in reflected energy during the phase change in the powder within a predetermined frequency range. Optionally, the VSWR measurement system 96 can produce a control signal indicative of an acceptable sintering of the powder which can be used to control processing parameters in the additive manufacturing system 10.

FIGS. 13A-16 shows a planar micro-inductive sintering flux concentrator 77 geometry that has been incorporated into the micro-inductive sintering system. This "air-core" flux concentrator can be fabricated from a 1 mm thick copper plate 82 and consists of a thin 0.25 mm slot 84 in communication with a 1 mm diameter loop 86 at the end. The loop 86 defines a single turn inductor 74 with an approximate inductance of 1 to 1.5 nH, which is over 100 times lower inductance than that of the flux concentrators 17, 37 described above. This copper plate 82 "solid-state" micro-inductive sintering flux concentrator 77 design concentrates the flux within the loop 86 in the copper plate 82. A capacitor 66 is located between opposite sides of the non-conducting slot 84 and adjacent the loop 86. In particular, the very small inductance and parasitic capacitance allows for operation at frequencies well in excess of 1 GHz—over 2000 times higher frequencies than conventional RF induction heating.

Figure 13B:
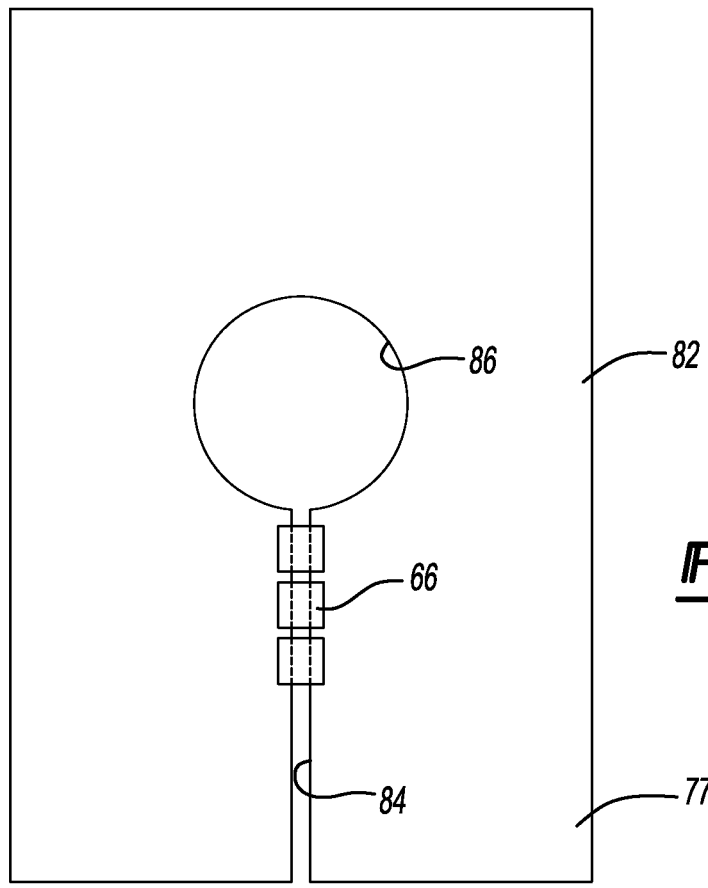
Figure 13C:
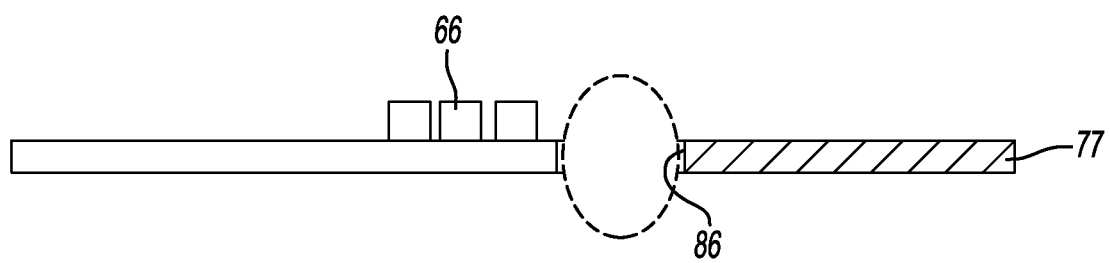
Figure 13D:
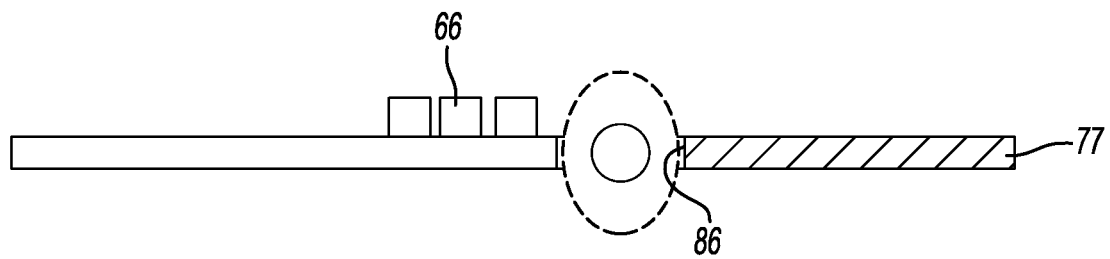

As shown in FIGS. 13C and 13D, the majority of the flux density is located above the loop 86, with very little flux density over the slot 84 outside of the tank circuit 60, thus confirming the concentration of the flux by the placement of the capacitor relative to the loop in the copper plate. Referring to Equation [2], there is nearly 40 times the power transfer over the single turn loop as compared to the slot in the micro-inductive sintering flux concentrator at 185 MHz. A particle within the alternating magnetic field are through heated as described above.

The flux density is sharply peaked near the center of the loop with a full-width half-maximum of approximately 2 mm at 0.5 mm from the surface of the micro-inductive sintering flux concentrator 17. Referring again to Equation [2], the active heating zone will be approximately 1 mm in diameter because the power transfer by induction is proportional to the square of the flux density. This results in a very sharply peaked hot zone in the micro-inductive sintering flux concentrator 17 heating profile.

Figure 14A:
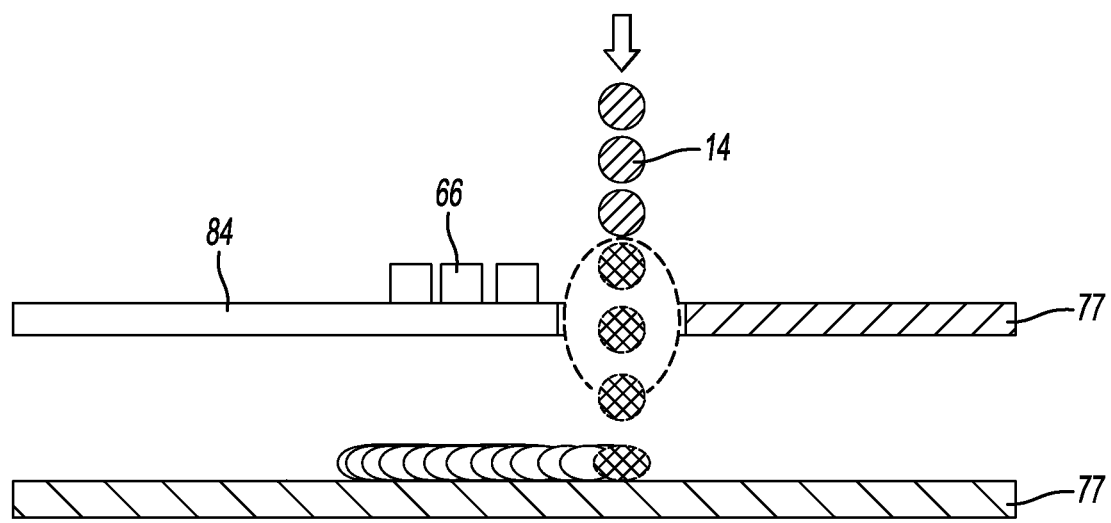
FIGS. 14A-14C depict the flux concentrator used to deposit melted particles onto a component.
Figure 14B:
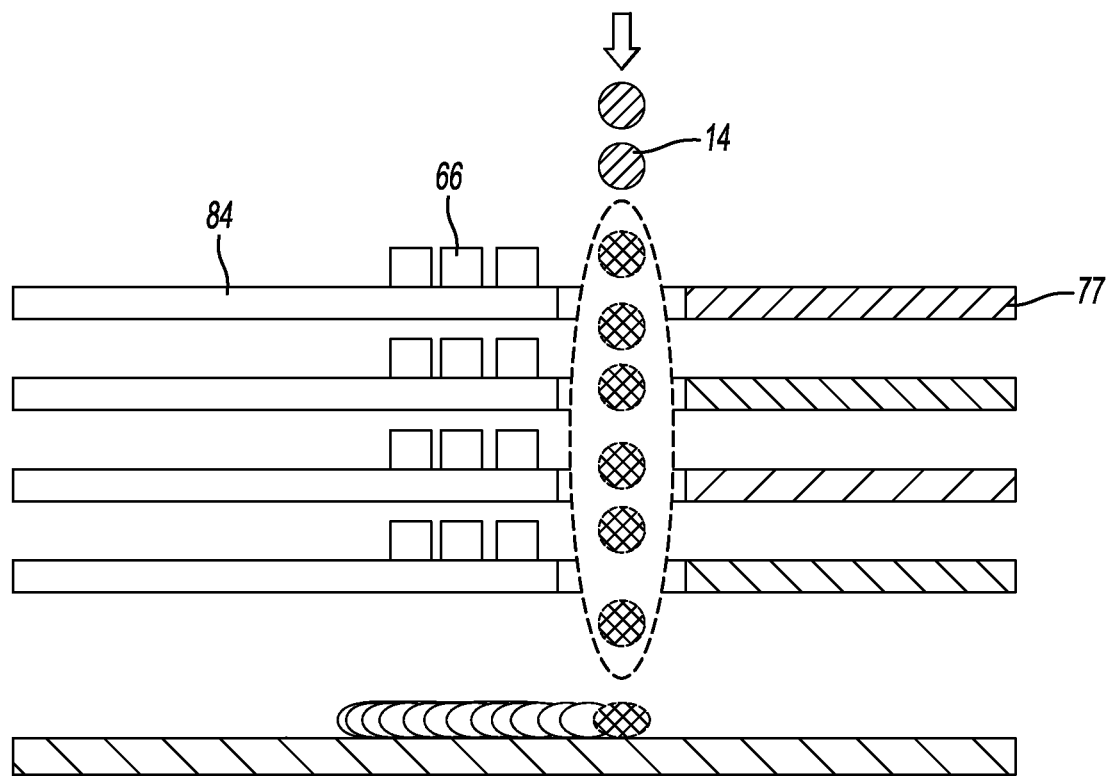
Figure 14C:
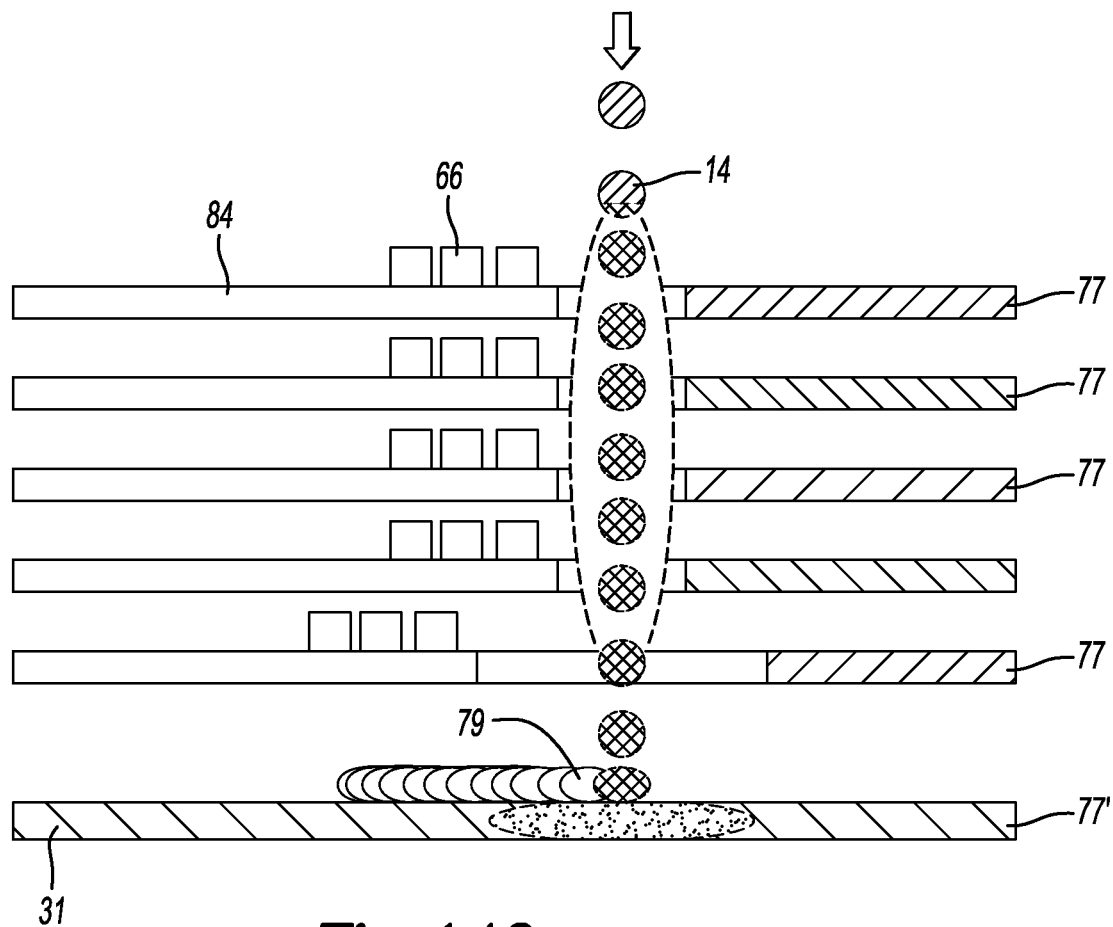

In the micro-inductive sintering system, a wide bandwidth micro-inductive sintering flux concentrator 77 is a means to couple effectively to all diameter particles in the metallic powder. As an alternative, sufficiently high frequencies can be used such that the vast majority of particles in a given size distribution are heated by either bulk or surface heating. In this regard, a fixed parallel capacitor tank circuit 60 can be designed specific to each powder distribution. As shown in FIGS. 14A-14C, particles can be passed through the magnetic concentrator where they are converted from a solid to a liquid. After conversion to a liquid, the particle is disposed onto the surface of the component. Optionally, a plurality of concentrator coils can be placed next to each other. To increase the length of the magnetic field, several concentrators can be placed in parallel. As seen in FIG. 14C, a specific coil 77' can be provided to heat a surface 79 of the component.

Figure 15A:
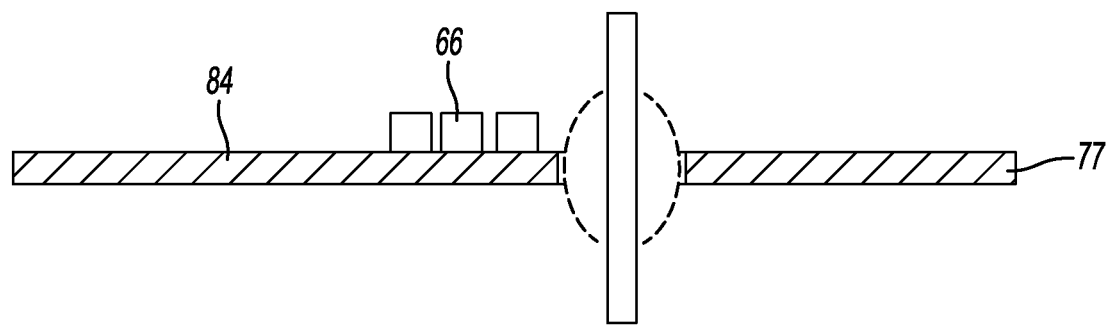
FIGS. 15A-15D depict the flux concentrator used to deposit melted wire onto a component.
Figure 15B:
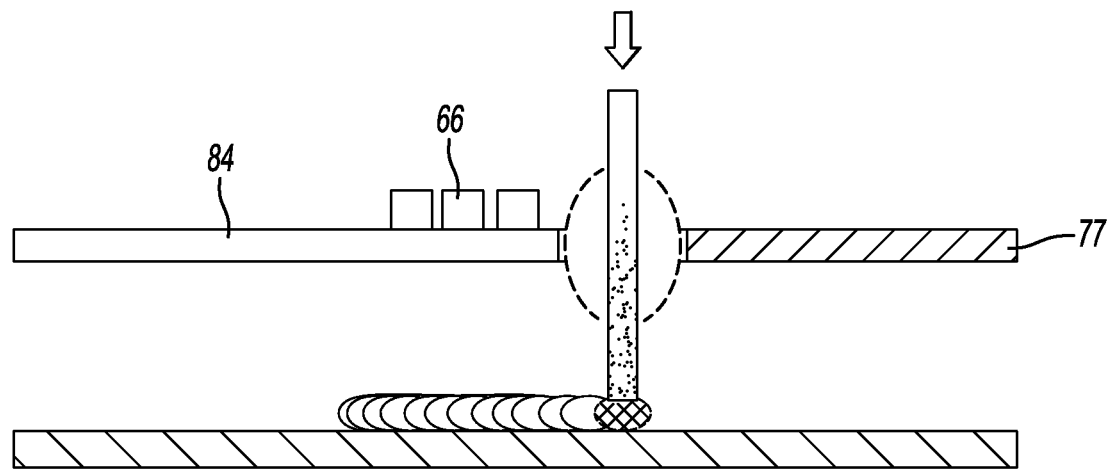
Figure 15C:
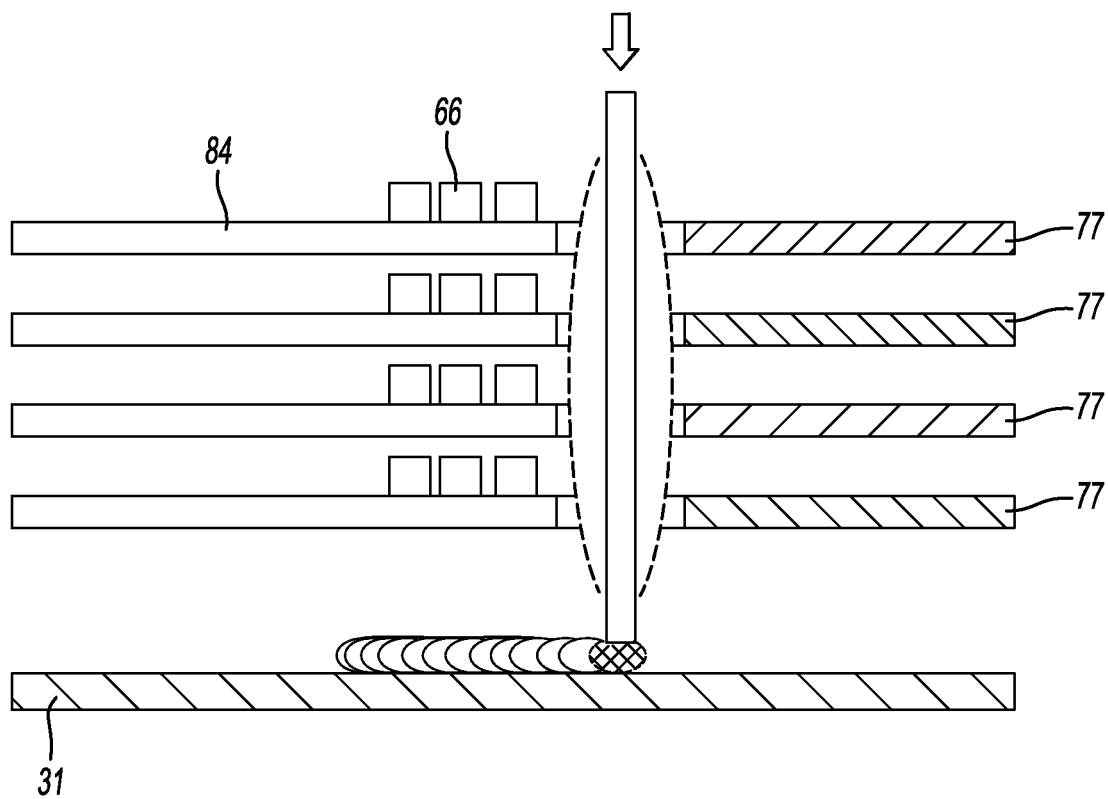
Figure 15D:
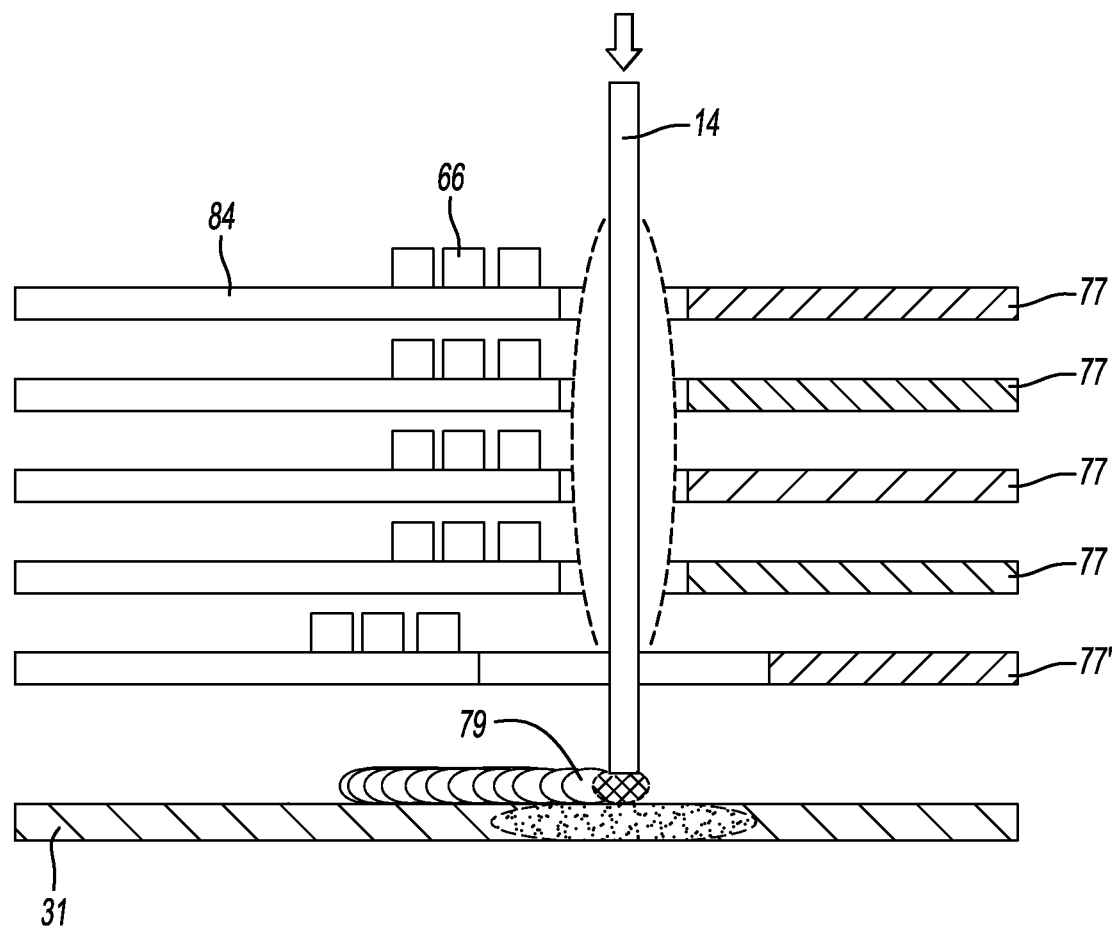

As shown in FIGS. 15A-15C, a material in the form of a wire can be passed through the magnetic concentrator where it is converted from a solid to a liquid. The frequency of the magnetic field is determined based on the diameter of the wire. After conversion to a liquid, the wire is disposed onto the surface of the component. As described above, a plurality of concentrator coils can be placed next to each other to define a passage therethrough. To increase the length of the magnetic field, several concentrators can be placed in parallel. As seen in FIG. 15D, a specific coil 77' can be provided to heat a surface 79 of the component.

Figure 16:
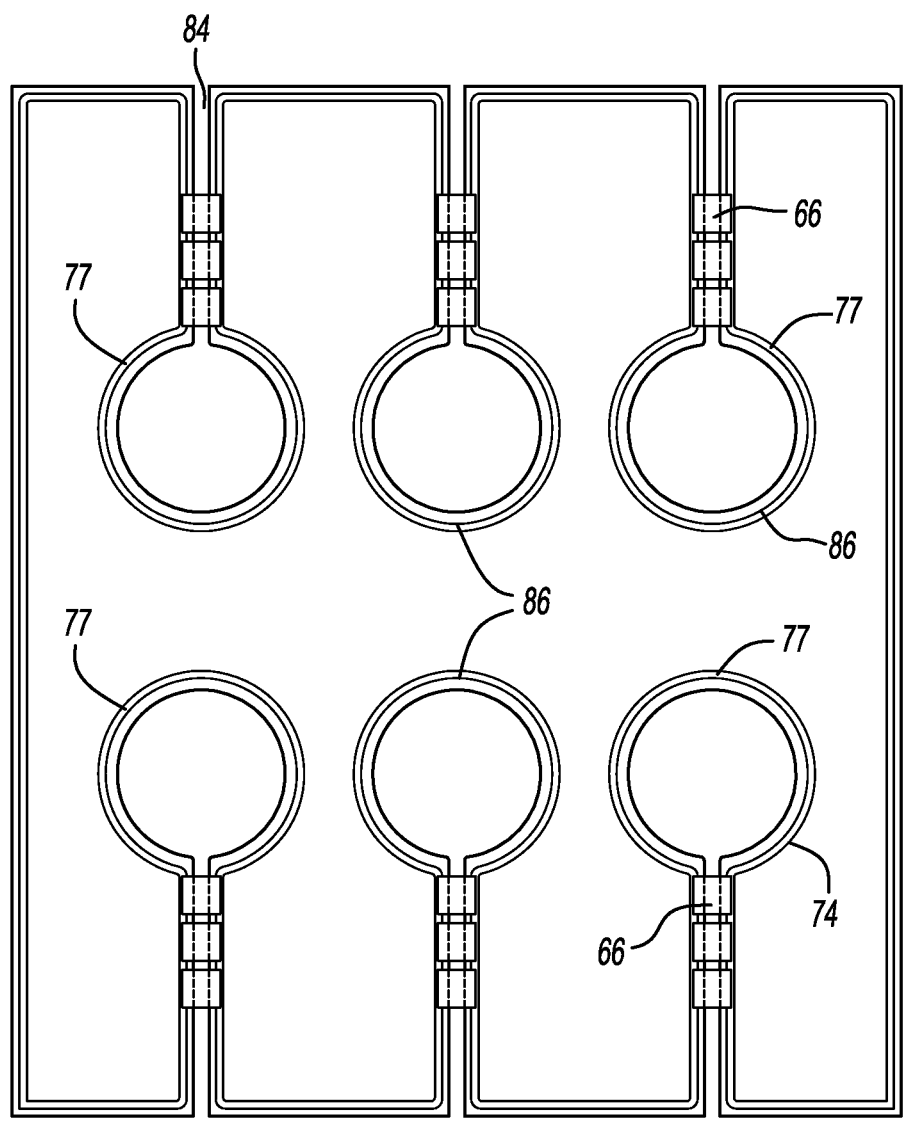
FIG. 16 represents alternate MIS concentrator head having a plurality of concentrator loops in a magnetic concentrator.

FIG. 16 shows a planar micro-inductive sintering flux concentrator 77 having a plurality of individual inductors. These individual inductors can be individually controlled. This "air-core" flux concentrator can be fabricated from a 1 mm thick copper plate 82 and consists of a thin 0.25 mm slot 84 in communication with a 1 mm diameter loop 86 at the end. The loop 86 defines a single turn inductor 74 with an approximate inductance of 1 to 1.5 nH. This copper plate 82 "solid-state" micro-inductive sintering flux concentrator 77 design concentrates the flux within the loop 86 in the copper plate 82. A capacitor 66 is located between opposite sides of the non-conducting slot 84 and adjacent the loop 86. In particular, the very small inductance and parasitic capacitance allows for operation at frequencies well in excess of 1 GHz—over 2000 times higher frequencies than conventional RF induction heating.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for forming a component comprising:
a table;
a platen movable relative to the table;
a powder dispenser configured to provide a layer of a powder over the table and the movable platen;
a heater configured to bulk heat the platen;
a flux concentrator configured to apply an alternating magnetic field to a portion of the layer of the powder, wherein exposure to the magnetic field changes the phase of at least a portion of the powder to liquid; and
an actuator coupled to the flux concentrator and configured to move the flux concentrator with respect to the table and the platen.

2. The system of claim 1, wherein the heater is a bulk induction heater configured to induce eddy currents in the platen.

3. The system of claim 2, wherein the bulk induction heater is disposed about the platen.

4. The system of claim 1, wherein two or more particles of the powder combine to form a consolidated material after at least one of the particles changes to the liquid phase.

5. The system of claim 1, wherein a second powder is mixed with the powder and particles of the second powder positioned adjacent to liquefied particles remain in a solid phase during energization of the flux concentrator.

6. The system of claim 2, further comprising a tube disposed about the platen, wherein the bulk induction heater is disposed the tube.

7. The system of claim 6, wherein the tube is a refractory material.

8. The system according to claim 1, further comprising a movable piston disposed beneath the platen.

9. The system according to claim 8, wherein the piston comprises a plurality of support members disposed between the piston and the platen.

10. The system according to claim 9, wherein the support members are frustoconical in shape.

11. The system according to claim 8, further comprising a plurality of radial support members disposed between the piston and the platen.

12. The system according to claim 1, wherein the actuator includes a gantry system configured to move the flux concentrator along three different axes.

* * * * *